(12) United States Patent
Momose

(10) Patent No.: US 10,071,309 B2
(45) Date of Patent: *Sep. 11, 2018

(54) INFORMATION PROCESSING PROGRAM AND INFORMATION PROCESSING APPARATUS

(71) Applicant: NINTENDO CO., LTD., Kyoto (JP)

(72) Inventor: Hiroshi Momose, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 42 days.

This patent is subject to a terminal disclaimer.

(21) Appl. No.: 15/461,074

(22) Filed: Mar. 16, 2017

(65) Prior Publication Data

US 2017/0203212 A1    Jul. 20, 2017

Related U.S. Application Data

(63) Continuation of application No. 13/410,462, filed on Mar. 2, 2012, now Pat. No. 9,616,337, which is a
(Continued)

(30) Foreign Application Priority Data

Aug. 24, 2007    (JP) .................................. 2007-217829

(51) Int. Cl.
*G06F 3/00*    (2006.01)
*A63F 13/42*    (2014.01)
(Continued)

(52) U.S. Cl.
CPC .............. *A63F 13/42* (2014.09); *A63F 13/10* (2013.01); *A63F 13/2145* (2014.09);
(Continued)

(58) Field of Classification Search
None
See application file for complete search history.

(56) References Cited

U.S. PATENT DOCUMENTS 4,516,156 A    5/1985    Fabris et al.
4,710,758 A *  12/1987   Mussler ................ G06F 3/0418
                                                    340/571
(Continued)

FOREIGN PATENT DOCUMENTS

EP    1 054 387 A2    11/2000
GB    2 395 645        5/2004
(Continued)

*Primary Examiner* — Henry Tsai
*Assistant Examiner* — Dean Phan
(74) *Attorney, Agent, or Firm* — Nixon & Vanderhye P.C.

(57) ABSTRACT

An information processing apparatus for processing information according to a command, including: an acceptor which repeatedly accepts an operation to designate a plurality of command elements of said command, said acceptor repeatedly performing to designate each of said command elements of said command; a determiner which determines whether or not a command satisfies an execution allowable condition after said acceptor accepts the operation designating the command element, wherein the determination of whether the command satisfies the execution allowable condition does not depend on an order of the repeated accepting processes by said acceptor or a sequence in which the command elements are designed in the repeated accepting processes by said acceptor; and an information processor which executes, when said determiner determines that the command satisfies the execution allowable condition, processing information according to said command.

17 Claims, 17 Drawing Sheets

Related U.S. Application Data continuation of application No. 12/078,896, filed on Apr. 8, 2008, now Pat. No. 8,151,007.

(51) Int. Cl.

| | | |
|---|---|---|
| *A63F 13/2145* | (2014.01) | |
| *A63F 13/40* | (2014.01) | |
| *G06F 3/0486* | (2013.01) | |
| *G06F 3/0488* | (2013.01) | |
| *A63F 13/48* | (2014.01) | |
| *A63F 13/49* | (2014.01) | |
| *G06F 3/0482* | (2013.01) | |
| *G06F 13/10* | (2006.01) | |

(52) U.S. Cl.
CPC .............. *A63F 13/48* (2014.09); *A63F 13/49* (2014.09); *G06F 3/0482* (2013.01); *G06F 3/0486* (2013.01); *G06F 3/04883* (2013.01); *G06F 3/04886* (2013.01); *G06F 13/102* (2013.01); *A63F 2300/204* (2013.01); *A63F 2300/301* (2013.01); *A63F 2300/308* (2013.01); *A63F 2300/6045* (2013.01)

(56) References Cited

U.S. PATENT DOCUMENTS

| | | |
|---|---|---|
| 5,210,834 A | 5/1993 | Zurawski et al. |
| 5,949,012 A | 9/1999 | Ishii |
| 6,608,624 B1* | 8/2003 | Wang ............... G06T 13/00 345/473 |
| 2003/0098803 A1* | 5/2003 | Gourgey ........... G06F 3/04886 341/21 |
| 2004/0023717 A1 | 2/2004 | Tsuda et al. |
| 2006/0128468 A1 | 6/2006 | Yoshikawa et al. |
| 2006/0227106 A1 | 10/2006 | Hashimoto et al. |
| 2006/0267955 A1 | 11/2006 | Hino |

FOREIGN PATENT DOCUMENTS

| | | |
|---|---|---|
| JP | 05-119946 | 5/1993 |
| JP | 2001-005485 | 1/2001 |
| JP | 2001-43397 | 2/2001 |
| JP | 2005-044026 | 2/2005 |
| JP | 2006-293476 | 10/2006 |
| JP | 2006-318392 | 11/2006 |

\* cited by examiner

| Data(0) | Data(1) | Data(2) | Data(3) |
|---|---|---|---|
| ATTACK | FIELD (CHARACTER PRESENT) | FIELD (CHARACTER PRESENT) | |
| MOVE | FIELD (CHARACTER PRESENT) | FIELD (CHARACTER ABSENT) | |
| POWER-UP | FIELD (CHARACTER PRESENT) | | |
| CHANGE PLACES | FIELD (CHARACTER PRESENT) | FIELD (CHARACTER PRESENT) | FIELD (CHARACTER PRESENT) |

| Data(0) : ACTION | Data(1), Data(2), ⋯ : FIELD | DETERMINATION |
|---|---|---|
| THERE IS ACTION | THE NUMBER OF FIELDS IS ENOUGH AND EACH FIELD IS APPROPRIATE TO ACTION | ○ |
| THERE IS ACTION | ANY FIELD IS NOT APPROPRIATE TO ACTION | × |
| THERE IS ACTION | THE NUMBER OF FIELDS IS NOT ENOUGH | △ |
| THERE IS NO ACTION | | △ |

INFORMATION PROCESSING PROGRAM AND INFORMATION PROCESSING APPARATUS

CROSS REFERENCE OF RELATED APPLICATION

This application is a continuation U.S. application Ser. No. 13/410,462 filed Mar. 2, 2012, which is a continuation of U.S. application Ser. No. 12/078,896 filed Apr. 8, 2008 and claims benefit of the disclosure of Japanese Patent Application No. 2007-217829, filed 24 Aug. 2007, wherein all of these applications are incorporated herein by reference.

BACKGROUND OF THE INVENTION

Field of the Invention

The present invention relates to an information processing program and an information processing apparatus. More specifically, the present invention relates to an information processing program and an information processing apparatus which accepts an operation, and processes information according to a command corresponding to the accepted operation.

Description of the Related Art

One example of an apparatus of such a kind is disclosed in Japanese Patent Application Laid-Open No. 2005-44026. The conventional apparatus displays on a display a plurality of keys (command element) including a ten key and a computation key, detects a touch operation to a touch panel provided to the display, and executes an arithmetic operation according to a command element array corresponding to the series of detected touch operations. For example, when four keys of "9", "÷", "3" and "=" are sequentially touched, an arithmetic operation "9÷3=" according to the command element array is executed.

Furthermore, another example is disclosed in Japanese Patent Laid-open No. 5-119946. In the related art, an operational object is displayed on a display, a touch operation to a touch panel provided to the display is detected, and the operational object on the display is moved on the basis of the detected result.

As a touch operation, there are two kinds including a touch operation (click-touch operation) being made up of a touch on to an arbitrary point and a touch off from the point, and a touch operation (sliding touch operation) being made up of a touch on to an arbitrary first point, a slide from the first point to an arbitrary second point and a touch off from the second point.

After a click-touch operation to a first point positioned within a display area of the operational object when a click-touch operation to a second point positioned outside the display area is performed, the operational object instantly moves to the position of the second point. On the other hand, when a sliding touch operation from the first point to the second point is performed, the operational object gradually moves to the position of the second point as the sliding progresses.

However, in the Patent Document 1, a command element array corresponding to one certain processing is only one, and it is impossible to change a designation order among the plurality of command elements.

On the other hand, the Patent Document 2 discloses two kinds of the touch operations like a click and a slide and a method of changing the way of movement of the operational object by the kind of the touch operations, but never discloses execution of the processing according to the command element array corresponding to the touch operation.

SUMMARY OF THE INVENTION

Therefore, a novel information processing program and an information processing apparatus is disclosed herein.

An information processing program and an information processing apparatus is disclosed that is capable of, when an operation of successively designating the plurality of command elements making up of a command is performed, changing the designation order among the plurality of command elements.

An information processing program and an information processing apparatus is disclosed capable of arbitrarily selecting any one of two kinds of touch operations as an operation.

It should be noted that reference numerals inside the parentheses and the supplementary explanations show one example of a corresponding relationship with the embodiments described later for easy understanding of the present invention, and do not limit the present invention.

An information processing program according to a first embodiment of invention causes a computer of an information processing apparatus for processing information according to a command to execute: an accepting step for repeatedly accepting an operation to designate at least one of a plurality of command elements making up of the command; a memory writing step for executing at least any one of a first memory writing processing to write a first command element having a specific attribute out of the command elements corresponding to the operation accepted by the accepting step in a first memory and a second memory writing processing to write a second command element having an attribute different from the specific attribute out of the command elements corresponding to the operation accepted by the accepting step in a second memory; a first determining step for determining whether or not a command element array stored over the first memory and the second memory satisfies an execution allowable condition every time that the writing processing by the memory writing step is executed; and an information processing step for, when the first determining step determines that the command element array stored over the first memory and the second memory satisfies the execution allowable condition, processing information according to the command element array.

In the first embodiment of the invention, a computer (34) of an information processing apparatus (10) executes an accepting step (S7, S9, S13, S15, S12b, S12c), a memory writing step (S23-S51, S34a-S34d, S46a-S46d), a first determining step (S53) and an information processing step (S55).

A command for causing a computer to execute information processing is made up out of a plurality of command elements (F1-F4, A1, A2, ... ). A user performs an operation for successively designating a plurality of command elements making up of a command, and at least one out of the plurality of command elements is designated by a single operation. Accordingly, a command being made up of two command elements require one or two operations, and a command being made up of three command elements requires one-three operations, for example.

An accepting step (S7, S9, S13, S15, S12b, S12c) repeatedly accepts an operation to designate at least one out of the plurality of command elements (F1-F4, A1, A2, ... ) making up of the command. A memory writing step (S23-S51, S34a-S34d, S46a-S46d) executes at least any one of a first memory writing processing to write a first command element (A1, A2, . . . ) having a specific attribute out of the command elements corresponding to the operation accepted by the accepting step in a first memory (72a) and a second memory writing processing to write a second command element (F1-F4) having an attribute different from the specific attribute out of the command elements corresponding to the operation accepted by the accepting step in a second memory (72b-72d).

A first determining step (S53) determines whether or not a command element array stored over the first memory and the second memory satisfies an execution allowable condition every time that any one of the writing processing is executed, and an information processing step (S55), when the first determining step determines that the command element array stored over the first memory and the second memory satisfies the execution allowable condition, processes information according to the command element array.

Additionally, when it is determined that the command element array stored over the first memory and second memory does not satisfy the execution allowable condition, the information processing is not executed, and until it is determined that it satisfies the execution allowable condition, a further operation is accepted by the accepting step.

According to the first embodiment of the invention, for every operation, out of the corresponding command elements, a first command element is written to the first memory, and a second command element is written to the second memory, so that the user can change, when performing an operation, a designation order among first command elements and the second command elements.

An information processing program according to a second invention is dependent on the first embodiment of the invention, and the operation includes a first operation for designating a single command element with a point, and a second operation for designating a plurality of command elements with a line.

In the second embodiment of the invention, the operation includes a first operation and a second operation. The first operation designates a single command element with a point, and the second operation designates a plurality of command elements with a line.

According to the second embodiment of the invention, the user can arbitrarily select any one of the first operation and the second operation as an operation. Furthermore, by enhancing the frequency of selection of the second operation, it is possible to decrease the number of operations.

An information processing program according to a third embodiment of the invention is dependent on the second embodiment of the invention, and the plurality of command elements making up of the command are displayed on a display, the first operation is a click-touch operation including a touch-on operation to an arbitrary point within a touch panel provided on the display and a touch-off operation from the point, and the second operation is a sliding touch operation including a touch-on operation to an arbitrary first point within the touch panel, a sliding operation from the first point to an arbitrary second point within the touch panel, and a touch-off operation from the second point.

In the third embodiment of the invention, a plurality of command elements making up of the command are displayed on a display (14), the first operation is a click-touch operation, and the second operation is a sliding touch operation. The click-touch operation includes a touch-on operation to an arbitrary point (P0) within a touch panel (24) provided on the display and a touch-off operation from the point. The sliding touch operation includes a touch-on operation to the arbitrary first point (P0) within the touch panel, a sliding operation from the first point to an arbitrary second point (P1) within the touch panel, and a touch-off operation from the second point.

An information processing program according to a fourth embodiment of the invention is dependent on the third embodiment of the invention, and causes the computer to further execute a buffer writing step. The buffer includes a first buffer and a second buffer, and the buffer writing step writes a command element corresponding to the touch-on operation in the first buffer while writing a command element corresponding to the touch-off operation in the second buffer. The memory writing step writes the command elements stored in the first buffer and the second buffer in the first memory or the second memory in response to the writing processing by the buffer writing step.

In the fourth embodiment of the invention, the buffer writing step (S11, S17, S12d) writes a command element corresponding to the touch-on operation in the first buffer (74a) and writes a command element corresponding to the touch-off operation in the second buffer (74b). The memory writing step writes the command elements stored in the first buffer and the second buffer in the first memory or the second memory in response to the writing processing by the buffer writing step.

An information processing program according to a fifth embodiment of the invention is dependent on the fourth embodiment of the invention, and causes a computer to further execute: a second determining step for determining whether or not the command element stored in the first buffer and the command element stored in the second buffer are coincident with each other after the writing processing by the buffer writing step; and a resetting step for resetting the second buffer when the second determining step determines that the command element stored in the first buffer and the command element stored in the second buffer are coincident with each other.

In the fifth embodiment of the invention, after the writing processing by the buffer writing step, a second determining step (S19) determines whether or not the command element stored in the first buffer and the command element stored in the second buffer are coincident with each other. A resetting step (S21) resets the second buffer when the second determining step determines that the command element stored in the first buffer and the command element stored in the second buffer are coincident with each other.

According to the fifth embodiment of the invention, in a case that a command element being in common to the first buffer and the second buffer is stored, the second buffer is reset, so that a sliding touch operation with respect to the common command element is regarded as a click-touch operation. Thus, it is easy to use both of the click-touch operation and the sliding touch operation.

An information processing program according to a sixth embodiment of the invention is dependent on the fourth or the fifth embodiment of the invention, and the buffer further includes a third buffer, and the buffer writing step further writes one or a plurality of command elements corresponding to the sliding operation in the third buffer.

In the sixth embodiment of the invention, one or a plurality of command elements corresponding to a sliding operation is written to the third buffer (74c, 74d, . . . ).

According to the sixth embodiment of the invention, it is possible to designate three or more command elements with a single sliding touch operation.

An information processing program according to a seventh embodiment of the invention is dependent on any one of the first to sixth embodiment of the invention, and the first command element is a command element having a function of a verb in a natural language, and the second command element is a command element having a function of any one of a subject and an object in association with the verb.

An information processing program according to an eighth embodiment of the invention is dependent on the seventh embodiment of the invention, and the natural language includes a first natural language forming a sentence indicating the command in an order of a subject, an object and a verb, and a second natural language forming the sentence indicating the command in an order of a subject, a verb and an object, and the operation designates a plurality of command elements making up of the command according to a syntax of the natural language arbitrarily selected out of the first natural language and the second natural language.

According to the seventh and the eighth embodiment of the invention, by complying with the syntax of the natural language, it is possible to enhance operability.

An information processing program according to a ninth embodiment of the invention is dependent on any one of the first to the eighth embodiment of the invention, and the determination processing by the first determining step is based on a database describing one or a plurality of executable command element arrays.

According to the ninth embodiment of the invention, by referring to a database (76c), it is possible to perform a determination easily and accurately. Furthermore, since possible combinations between the first command elements and the second command elements are only necessary to be registered (that is, possible orders are not required to be carried on the database), the information amount of the database can be reduced.

An information processing apparatus (10) according to a tenth embodiment of the invention is an information processing apparatus for processing information according to a command, and comprises: an accepting means (S7, S9, S13, S15, S12b, S12c) for repeatedly accepting an operation to designate at least one of a plurality of command elements (F1-F4, A1, A2, . . . ) making up of the command; a memory writing means (S23-S51, S34a-S34d, S46a-S46d) for executing at least any one of a first memory writing processing to write a first command element (A1, A2, . . . ) having a specific attribute out of the command elements corresponding to the operation accepted by the accepting means in a first memory (72a) and a second memory writing processing to write a second command element (F1-F4) having an attribute different from the specific attribute out of the command elements corresponding to the operation accepted by the accepting means in a second memory (72b-72d); a determining means (S53) for determining whether or not a command element array stored over the first memory and the second memory satisfies an execution allowable condition every time that the writing processing by the memory writing means is executed; and a information processing means (S55) for, when the determining means determines that the command element array stored over the first memory and the second memory satisfies the execution allowable condition, processing information according to the command element array.

In the tenth embodiment of the invention, similar to the first invention, it is possible to change a designation order among the first command elements and the second command elements.

According to the embodiments of the present invention disclosed herein, when an operation of successively designating a plurality of command elements making up of a command is executed, it is possible to change a designation order between the first command elements and the second command elements having different attributes with each other out of the plurality of command elements. Furthermore, it is possible to arbitrarily select two kinds of touch operations of a click and a slide as a touch operation, resulting in enhancement of operability.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing a Data array DB applied to FIG. 1 embodiment;

FIG. 5 is an illustrative view showing a judgment standard DB applied to FIG. 1 embodiment;

DETAILED DESCRIPTION OF THE PREFERRED EMBODIMENTS

Figure 1:
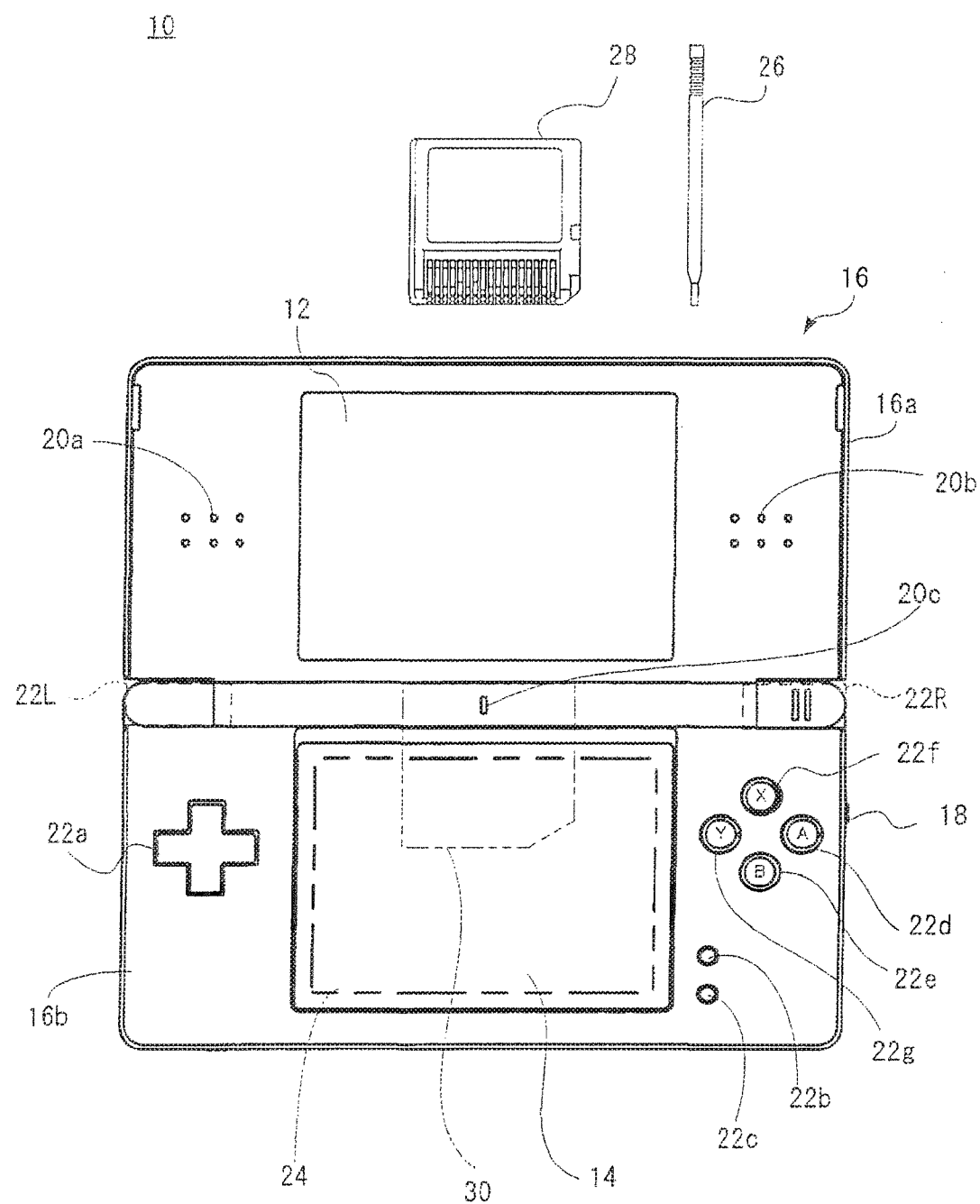
FIG. 1 is an illustrative view showing one embodiment of the invention.

Referring to FIG. 1, a game apparatus 10 according to this embodiment includes a first liquid crystal display (LCD) 12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a shape and a size approximately the same as the upper housing 16a, and has an opening formed so as to expose a display surface of the LCD 14 at an approximately center of the horizontal direction. Also, a power switch 18 is provided at the right side surface of the lower housing 16b.

Furthermore, the upper housing 16a is provided with sound release holes 20a and 20b for speakers 36a and 36b (see FIG. 2) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice or a breath taken from the microphone.

Furthermore, the lower housing 16b is provided with an operating switch 22 (22a, 22b, 22c, 22d, 22e, 22f, 22g, 22L and 22R).

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the operating switches 22L and 22R are arranged at the right and left corners on the upper side surface of the lower housing 16b. It should be noted that the action switches 22L and 22R are provided on a back surface of the lower housing 16b, and shown by dotted line because they are hidden under the connected portion in a front view shown in FIG. 1.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position by the stick 26, etc. to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Furthermore, by utilizing the two LCD 12 and LCD 14 as one screen, it is possible to display a large monster (enemy object) to be defeated by the player object.

Accordingly, the player is able to point (operate) an image such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

Although the first LCD 12 and the second LCD 14 are vertically arranged in this embodiment, the arrangement of the two LCDs may be changed as necessary. In another embodiment, the first LCD 12 and the second LCD 14 may horizontally be arranged.

Furthermore, in this embodiment, two LCDs are provided, but the number of LCDs as a display means can be changed as necessary. In another embodiment, a vertically-long LCD is provided, and by vertically dividing the display areas into two, two game screens may be displayed on the respective display areas, or a horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on an upper edge surface of the lower housing 16b. Although omitted in FIG. 1, a connector 32 (see FIG. 2) is provided at a depth portion of the loading slot 30 for connecting a connector provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

It should be noted that although not illustrated in FIG. 1, the speakers 36a and 36b (see FIG. 2) are provided at positions corresponding to the sound release holes 20a and 20b inside the upper housing 16a.

Furthermore although omitted in FIG. 1, a battery accommodating box is provided on a rear surface of the lower housing 16b, a volume switch, an earphone jack, etc. are provided on the lower edge surface (bottom surface) of the lower housing 16b, and an external expansion connector is provided on the upper edge surface (top surface), for example.

Figure 2:
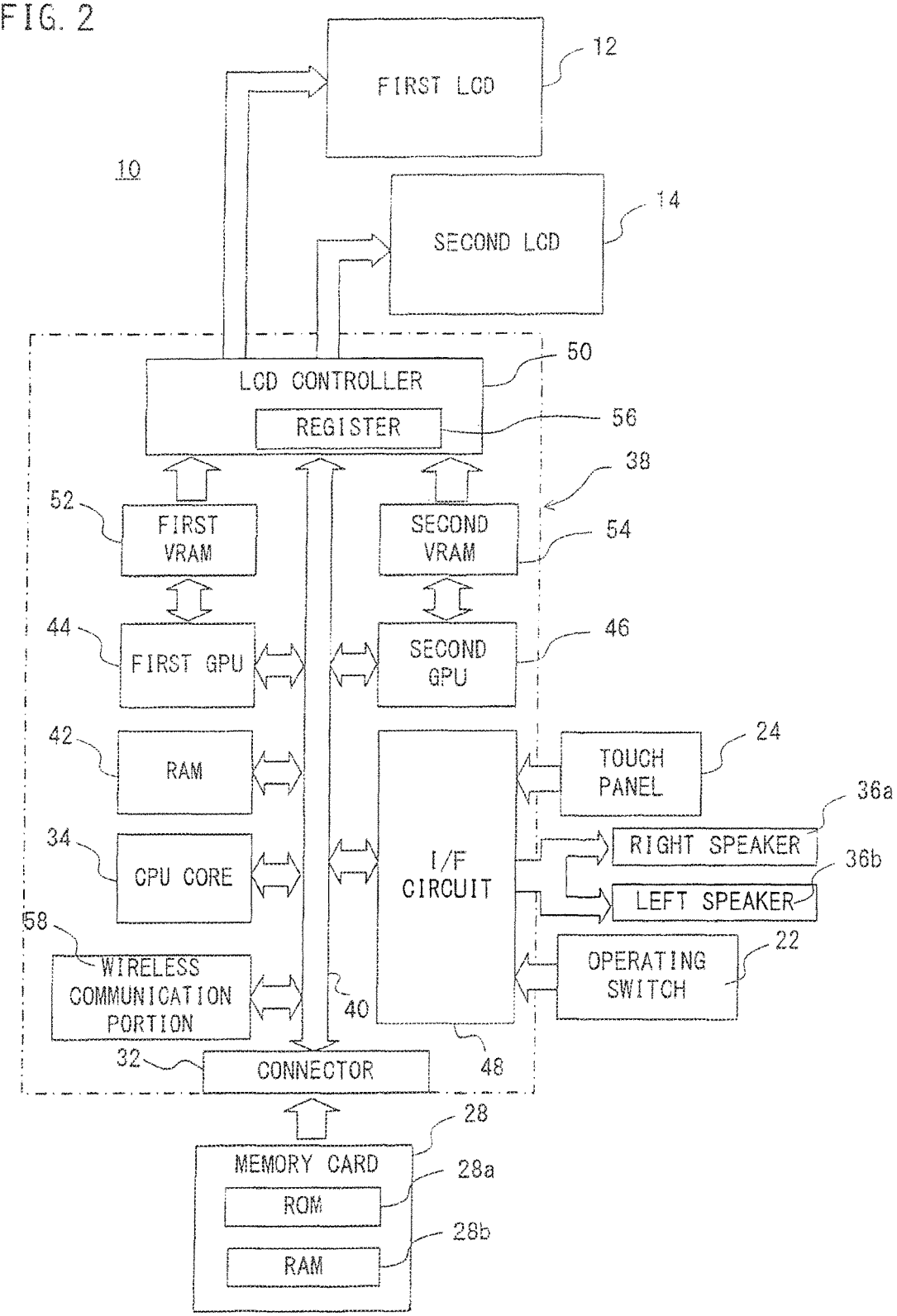
FIG. 2 is a block diagram showing an electric configuration of FIG. 1 embodiment.

An electric configuration of the game apparatus 10 is shown in FIG. 2. Referring to FIG. 2, the game apparatus includes an electronic circuit board 38, and on the electronic circuit board 38, a circuit component such as a CPU core 34, etc. is mounted. The CPU core 34 is connected to the above-described connectors 32 via a bus 40, and is connected with a RAM 42, a first graphics processing unit (GPU) 44, a second GPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc. As a save memory, a flash memory or the like may be utilized.

The RAM 42 is utilized as a buffer memory or a working memory. That is, the CPU core 34 loads the program, the image data, the sound data, etc. stored in the ROM 28a of the memory card 28 into the RAM 42, and executes processing according to the loaded program. Furthermore, the CPU core 34 executes a game process while storing data (game data, flag data, etc.) generated or obtained in correspondence with a progress of the game in the RAM 42.

Additionally, the game program, the image data, the sound data, etc. are read from the ROM 28a entirely at a time, or partially and sequentially so as to be stored into the RAM 42.

It should be noted that in the game apparatus 10, other applications except for the game may be executed, and in this case, a program in relation to an application and the necessary data such as image data, etc. may be stored in the ROM 28a of the memory card 28. Furthermore, sound (music) data may be stored as necessary.

Each of the GPU 44 and the GPU 46 forms a part of a rendering means, is constructed by, for example, a single chip ASIC, and receives a graphics command (drawing instruction) from the CPU core 34 to generate image data according to the graphics command. It should be noted that the CPU core 34 applies an image generation program (included in the game program) required to generate the image data to both of the GPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) to execute a graphics command.

In addition, the CPU core 34 writes image data necessary for drawing to the first VRAM 52 and the second VRAM 54 via the GPU 44 and the GPU 46. The GPU 44 accesses the VRAM 52 to produce image data necessary for drawing, and the GPU 46 accesses the VRAM 54 to produce image data for drawing.

The VRAM 52 and the VRAM 54 are connected to the LCD controller 50. The LCD controller 50 includes a register 56, and the register 56 consists of one bit, for example, and stores a value of "0" or "1" (data value) according to an instruction of the CPU core 34. The LCD controller 50 outputs the image data produced by the GPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the GPU 46 to the LCD 12 in a case that the data value of the register 56 is "1".

Furthermore, the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a, 36b. Here, the operating switch 22 is the above-described switches 22a, 22b, 22c, 22d, 22e, 22f, 22g, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

The wireless communication portion 58 is a communication means for transmitting and receiving data with another game apparatus (10) or communications equipment by radio. Here, the weak radio wave transmitted and received by the game apparatus 10 shown in this embodiment is set in intensity to such a degree as not to be restricted by the Radio Law. When the CPU core 34 applies data such as game data, a command, etc. to the wireless communication portion 58, the wireless communication portion 58 modulates data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 receives and transmits data with another game apparatus (10) to execute a communication game. Additionally, the game apparatus 10 can connect to a network via the wireless communication portion 58 to thereby download a program and data from a server on the network and communicate with another game apparatus (10) via the network.

Figure 3:
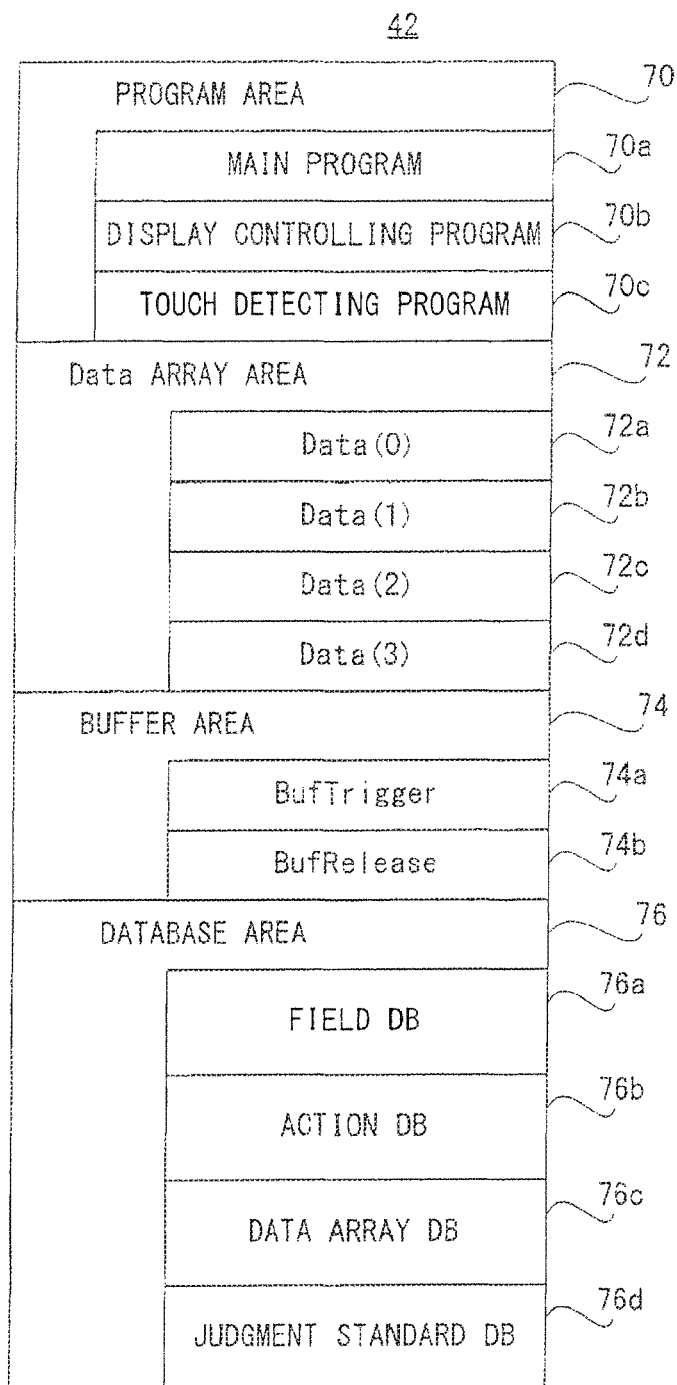
FIG. 3 is an illustrative view showing a memory map of a RAM applied to FIG. 1 embodiment.

FIG. 3 shows a memory map of the RAM 42 when a certain kind of game is played in the game apparatus 10 constructed as described above. Referring to FIG. 3, the RAM 42 is formed with a program area 70, a Data array area 72, a buffer area 74 and a database area 76.

The program area 70 includes a main program area 70a for storing a main program, a display controlling program area 70b for storing a display controlling program and a touch detecting program area 70c for storing a touch detecting program. The Data array area 72 includes a Data (0) area 72a for storing Data (0), a Data (1) area 72b for storing Data (1), a Data (2) area 72c for storing Data (2), and a Data (3) area 72d for storing Data (3).

The buffer area 74 includes a BufTrigger area 74a for storing a BufTrigger, and a BufRelease area 74b for storing a BufRelease. The database area 76 includes a field DB area 76a for storing a field database (DB), an action DB area 76b for storing an action DB, a Data array DB area 76c for storing a Data array DB, and a judgment standard area 76d for storing a judgment standard DB.

Figure 8A:
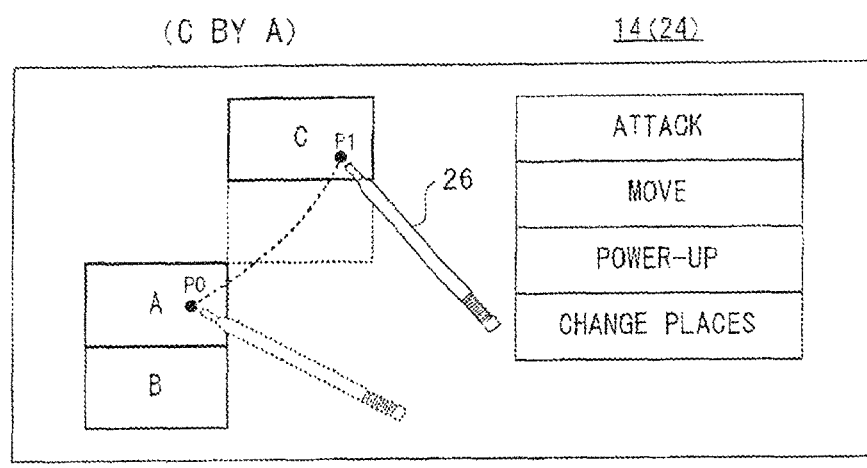
FIG. 8(A) and FIG. 8(B) are illustrative views showing one example of a touch operation with respect to the screen in FIG. 7 in a chronological order.
Figure 8B:
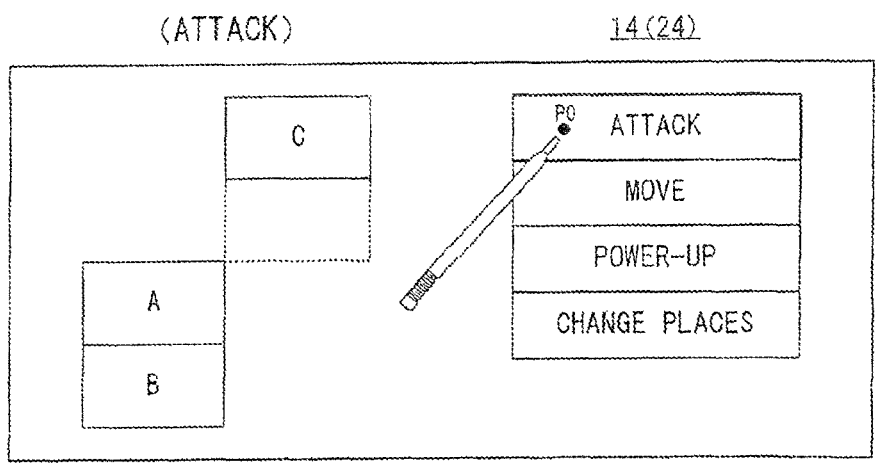

The touch detecting program detects a touch operation (see FIG. 8(A), FIG. 8(B), for example) to the screen of the LCD 14 via the touch panel 24, and repetitively calculates touched coordinates indicative of coordinates of a touched point at a current time. The display controlling program displays fields F1-F4 and actions A1, A2, . . . on the basis of the field DB and the action DB on the screen of the LCD 14 (see FIG. 6). A character is added to each of the fields F1-F4 as necessary.

Figure 6:
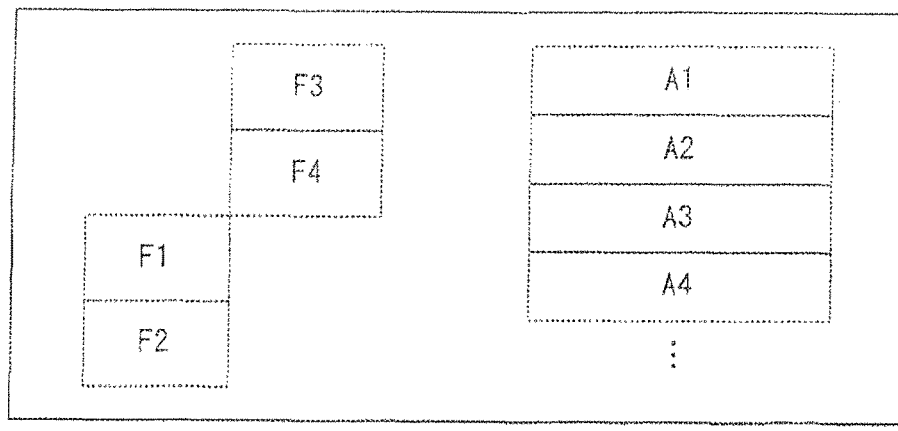
FIG. 6 is an illustrative view showing a configuration of an operation screen applied to FIG. 1 embodiment.
Figure 7:
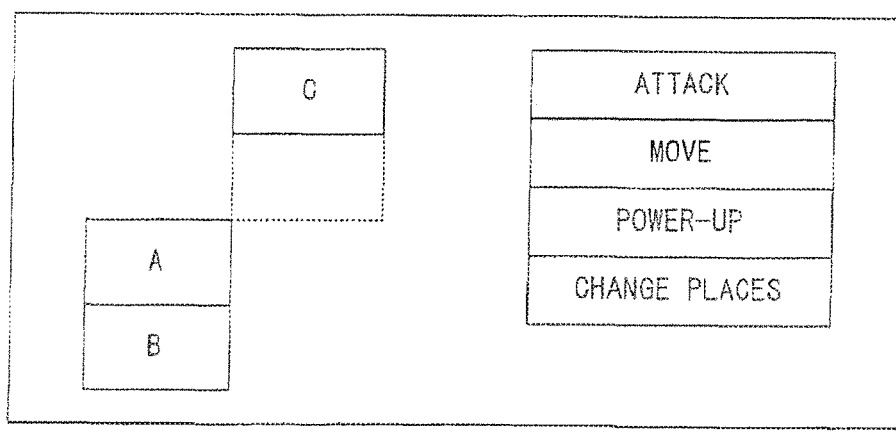
FIG. 7 is an illustrative view showing a concrete example of the operation screen.

FIG. 7 shows a concrete example of the screen in FIG. 6. With reference to FIG. 7 in comparison with FIG. 6, as to the screen, the field F1 is a field to which a character A is assigned, the field F2 is a field to which a character B is assigned, the field F3 is a field to which a character C is assigned, and the field F4 is an available field to which no character is assigned. Furthermore, the action A1 is to "attack", the action A2 is to "move", the action A3 is to "power-up", and the action A4 is to "change places".

Returning to FIG. 3, the main program specifies a field and an action designated by the user out of the fields and actions displayed on the LCD 14 by the display controlling program on the basis of the touch coordinates calculated by the touch detecting program, and executes processing relevant to the field and action.

More specifically, in a case that on the screen of FIG. 7, the filed F1 assigned with character A is first designated, the filed F3 assigned with character C is next designated, and the action A1, that is, "attack" is designated, attack processing to the character C by the character A is executed. Here, if the designation order of the fields F1 and F3 is reverse, attack processing to the character A by the character C is executed. That is, which field is a subject of the action and which field is an object of the action are dependent on the order of designating the fields.

Furthermore, when the filed F1 assigned with character A is first designated, the available field F4 is designated, and the action A2, that is, "move" is designated, movement processing of the character A from the field F1 to the field F4 is executed. If the designation order of the fields F1 and F4 is reverse, there is no character to be moved, so that the movement processing is not executed. Even if the action A1 is designated in place of the action A2, it is determined that an attack to the available field is inappropriate, so that attack processing is not executed. Thus, execution of the processing relevant to the designated field and action is only when the relationship between the field and the action is appropriate.

Returning to FIG. 3, each of the Data (0)-Data (3) is a variable utilized in the main program, setting any one of the fields or the actions as required. The BufTrigger and the BufRelease are also variables to be utilized in the main program, setting any one of the fields or the actions as required.

In the field DB, coordinates and a character are registered for each field. It should be noted that there is a field to which no character is assigned. In the action DB, an action is registered for each character.

In the Data array DB, an appropriate alignment of the Data (0)-Data (3) is registered for each action. In the judgment standard DB, a reference is registered for determining whether or not the Data array at the current time is appropriate (○) or inappropriate (x), or neither of them (Δ) on the basis of the Data array DB.

FIG. 4 shows one example of the Data array DB.

Referring to FIG. 4, the Data array DB includes following four kinds of Data arrays. The first one is a Data array in which the Data (0) is to "attack", each of the Data (1) and Data (2) is a character-present filed and the Data (3) is unused. The second one is a data array in which the Data (0) is to "move", the Data (1) is a character-present-field, the Data (2) is a character-absent field, and the Data (3) is unused. The third one is a data array in which the Data (0) is to "power-up", the Data (1) is a character-present field, and each of the Data (2) and Data (3) is unused. The fourth one is a data array in which the Data (0) is to "change places", and each of the Data (1) to Data (3) is a character-present-field.

FIG. 5 shows one example of the judgment standard DB. Referring to FIG. 5, according to the judgment standard DB, it is determined whether or not any action is set in relation to the Data (0), first. If it is determined "there is an action" here, with respect to each of the Data (1), Data (2), . . . , the number of field-present-Data, and appropriateness of each field to an action are studied to make a classification into three cases.

The first case is a case where the number of field-present-Data reaches the number of Data necessary for action, and each field is appropriate to the action, and is determined to be an appropriate (○). The second case is a case where any one of the fields is inappropriate to an action, and is determined to be inappropriate (x). Then, the third case is a case where the number of field-present-Data does not satisfy the necessary number of Data, and is determined to be neither of appropriate nor inappropriate (Δ).

On the other hand, when "no action" is determined, it is determined to be neither of appropriate nor inappropriate (Δ).

It should be noted that, in a case that "no action" is determined, the number of field-present-Data may be determined to make classification into two cases. The first case is a case where the number of field-present-Data is equal to or more than "2", and is determined to be inappropriate (x). The second case is a case where the number of field-present-Data is equal to or less than "1", and is determined to be neither of appropriate nor inappropriate (Δ).

By the way, as described before, when the fields and the action are designated, the user has to designate these elements in a proper order, but the proper order is not necessary one. For example, in the screen in FIG. 7, an instruction for making an attack on the character C by the character A can be made in the following two orders.

A first order is an order according to a Japanese syntax as shown in FIG. 8(A) and FIG. 8(B), and the user first touches "A" being a subject, then touches "C" being an object, and last touches "attack" being a verb (S+O+V).

Specifically, the first touch for designating the subject and the second touch for designating the object are performed by a single touch operation. The touch operation is made up of three elements like a touch on to the subject, a slide from the subject to the object, and a touch off from the object. Such a touch operation is called a "sliding touch operation".

On the other hand, the third touch for designating the verb is another single touch operation, and is made up of two elements including a touch on to the verb and a touch off from the verb. Such a touch operation is called as a "click-touch operation". Thus, in a case that execution of "attack" on "C" by "A" is instructed in the first order (that is, according to the Japanese grammar), one sliding touch operation and one click-touch operation are required (the series of operations is described as "F1-F3/A1").

Figure 9A:
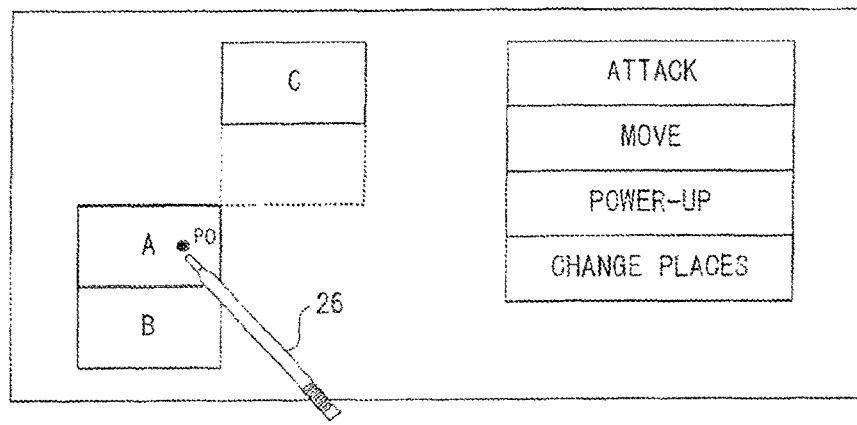
FIG. 9(A)-FIG. 9(C) are illustrative views showing another example of a touch operation with respect to the screen in FIG. 7 in a chronological order.
Figure 9B:
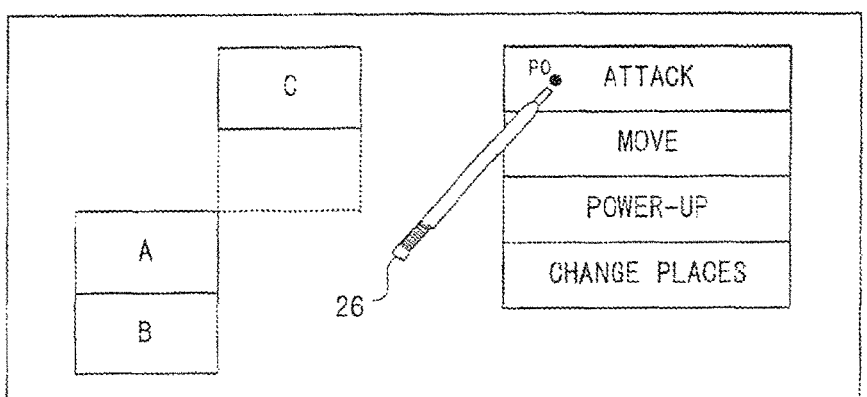
Figure 9C:
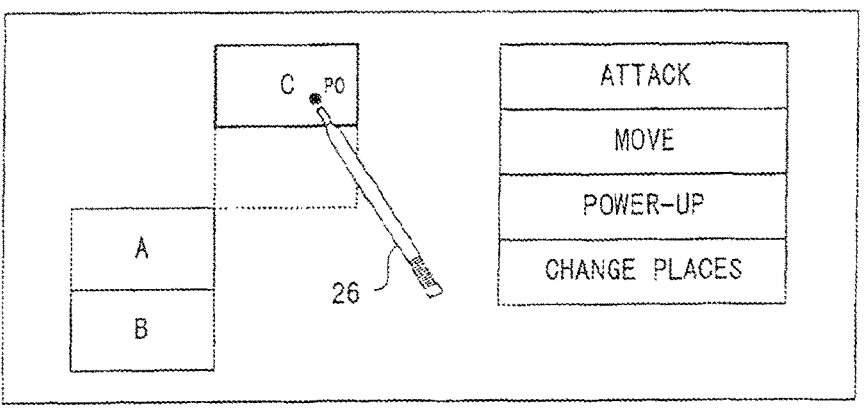

On the contrary thereto, the second order is an order according to the English syntax as shown in FIG. 9(A)-FIG. 9(C). That is, the user first touches "A" being a subject, next touches "attack" being a verb, and last touches "C" being an object (S+V+O). Accordingly, in a case that an execution of making an attack from "A" to "C" is instructed in the second order (that is, according to the English grammar), three click-touch operations are required (the series of operations is described as a "F1/A1/F3").

The above description is summarized as follows: if an instruction by the user is equal to any one of "F1-F3/A1" and "F1/A1/F3", the game apparatus 10 executes attack processing from "A" to "C". Similarly, if an instruction by the user is equal to any one of "F1-F4/A2" and "F1/A2/F4", the game apparatus 10 executes movement processing of "A" to an available field. If an instruction by the user is equal to "F2/A3", the game apparatus 10 executes power-up processing of "B". If an instruction by the user is equal to any one of "F3-F1/A4/F2", "F3-F2/A4/F1", "F3/A4/F1/F2", "F3/A4/F2/F1", "F3/A4/F1-F2", and "F3/A4/F2-F1", the game apparatus 10 executes interchange processing between "A" and "B" by "C".

Thus, the user can make the game apparatus 10 perform desired processing by appropriately designating one or the plurality of fields (Data (1), Data (2), . . . ) and one action (Data (0)). When the designation is made, both of the first order according to the Japanese syntax (S+O+V) and the second order according to the English syntax (S+V+O) are possible as an order among the Data (0) corresponding to the verb (V), the Data (1) corresponding to the subject (S), and the Data (2) corresponding to the object (O).

Furthermore, if the first order (Japanese grammar) is selected, the subject and the object can be designated by a single sliding touch operation (S-O).

It should be noted that the actions A1-A4 are different for each character, and when no character is designated, non display is determined, and when any character is designated at the first touch in order to designate the subject, an action corresponding to the designated character is displayed.

When the game is played, the CPU core 34 executes processing shown in FIG. 10-FIG. 13. It should be noted that the flowchart corresponds to the main program (70a: see FIG. 3) stored in the program area 70 of the RAM 42.

Figure 10:
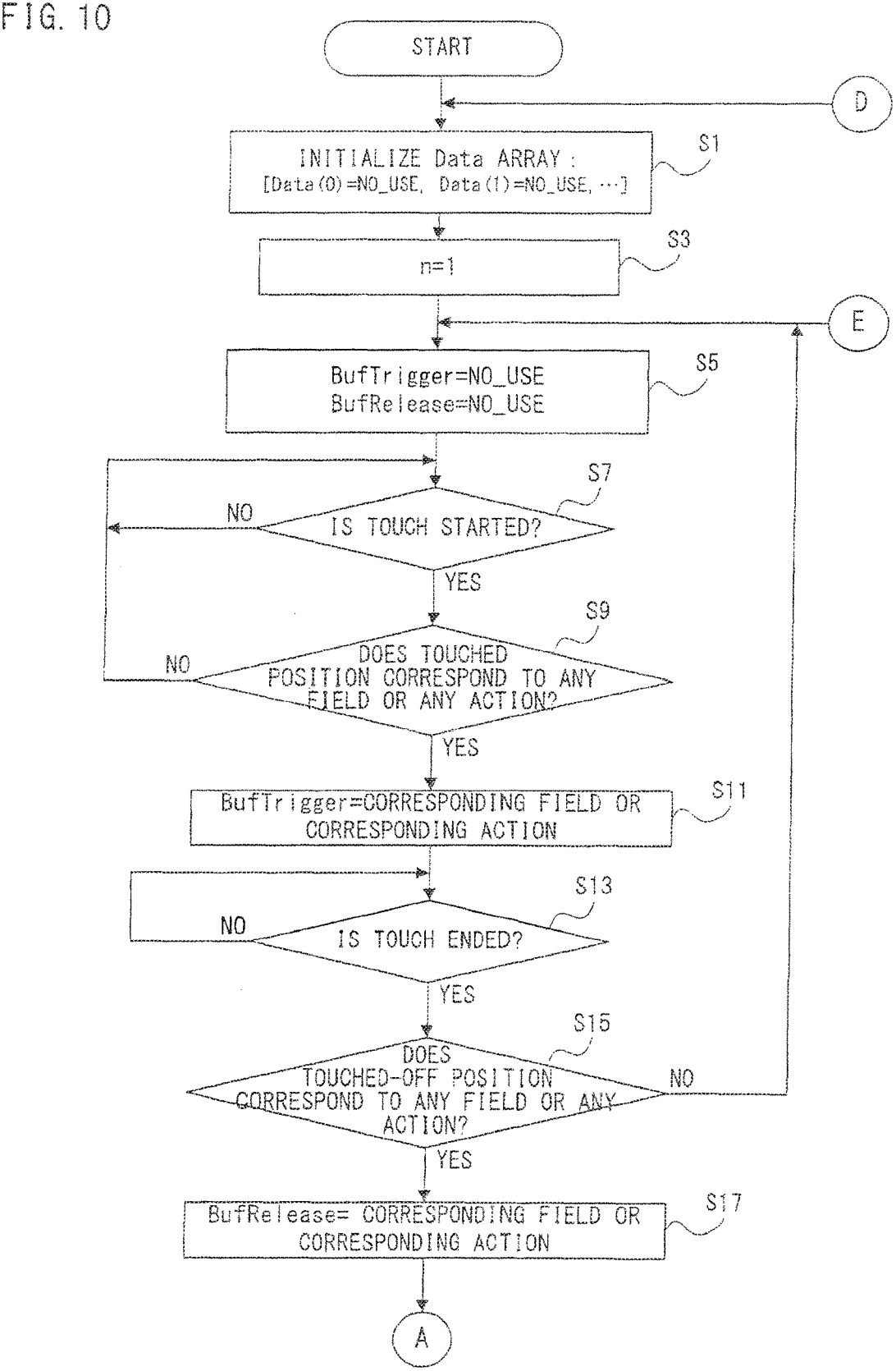
FIG. 10 is a flowchart showing apart of an operation of a CPU applied to FIG. 1 embodiment.

Referring to FIG. 10, in a first step S1, a Data array, that is, Data(0)-Data(3) (72a-72d: see FIG. 3) stored in the Data array area 72 is initialized. In a next step S3, "1" is set to a variable n indicating Data being noted. In a succeeding step S5, "NO_USE" as initial values are set to a variable BufTrigger and a variable BufRelease (74a and 74b: see FIG. 3) respectively indicating touch-on coordinates and touch-off coordinates. After completion of a series of the initial settings, the process shifts to a step S7 to wait for a start of a touch operation (touch on).

When a touch on is detected by the touch panel 24, the process shifts from the step S7 to a step S9 to determine whether or not the touched-on position corresponds to any one of the fields or the actions (F1-F3, A1, A2, . . . : see FIG. 6) displayed on the LCD 14, and if the determination result is "NO", the process returns to the step S7.

If the determination result in the step S9 is "YES", the process shifts to a step S11 to set a corresponding field or a corresponding action in the variable BufTrigger. Then, the process shifts to a step S13 to wait for an end of a touch operation (touch off).

When a touch off is detected via the touch panel 24, the process shifts from the step S13 to a step S15 to determine whether or not a touched-off position corresponds to any one of the fields or the actions displayed on the LCD 14, and if the determination result is "NO", the process returns to the step S5.

If the determination result in the step S15 is "YES", the process shifts to a step S17 to set a corresponding field or a corresponding action in the variable BufRelease. After the setting, the process shifts to a step S19.

Figure 11:
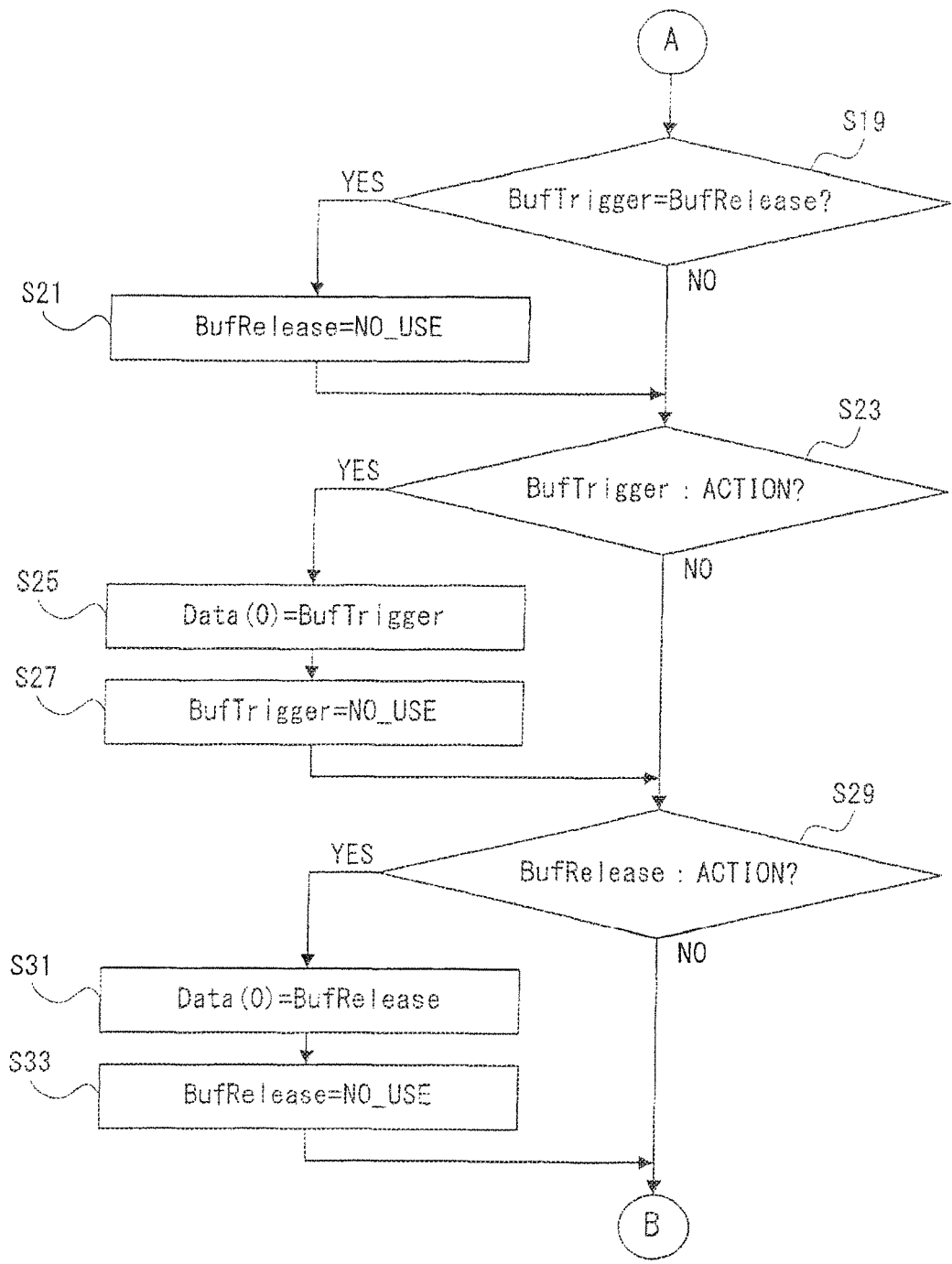
FIG. 11 is a flowchart showing another part of the operation of the CPU applied to FIG. 1 embodiment.

Referring to FIG. 11, in the step S19, it is determined whether or not the variable BufTrigger is coincident with the variable BufRelease. If the difference between both of the variables is above a threshold value, "NO" is determined in the step S19, and the process proceeds to a step S23. If the difference between both of the variables is not above the threshold value, "YES" is determined in the step S19, the variable BufRelease is reset in a step S21, and then, the process proceeds to the step S23.

Accordingly, a sliding touch operation performed in a single area corresponding to any one of the fields and the actions is regarded as a click-touch operation.

In the step S23, it is determined whether or not the variable BufTrigger belongs to "action" (that is, whether or not any action is set), and if the determination result is "NO", the process proceeds to a step S29. If the determination result in the step S23 is "YES", the variable BufTrigger is set to the Data (0) in a step S25, the variable BufTrigger is reset in a step S27, and the process proceeds to the step S29.

In the step S29, it is determined whether or not the variable BufRelease belongs to "action", and if the determination result is "NO", the process proceeds to a step S35. If the determination result in the step S29 is "YES", the variable BufRelease is set to the Data (0) in a step S31, the variable BufRelease is reset in a step S33, and then, the process proceeds to the step S35.

Thus, if the user designates two or more actions by a single sliding touch operation, the action designated last is adopted.

Figure 12:
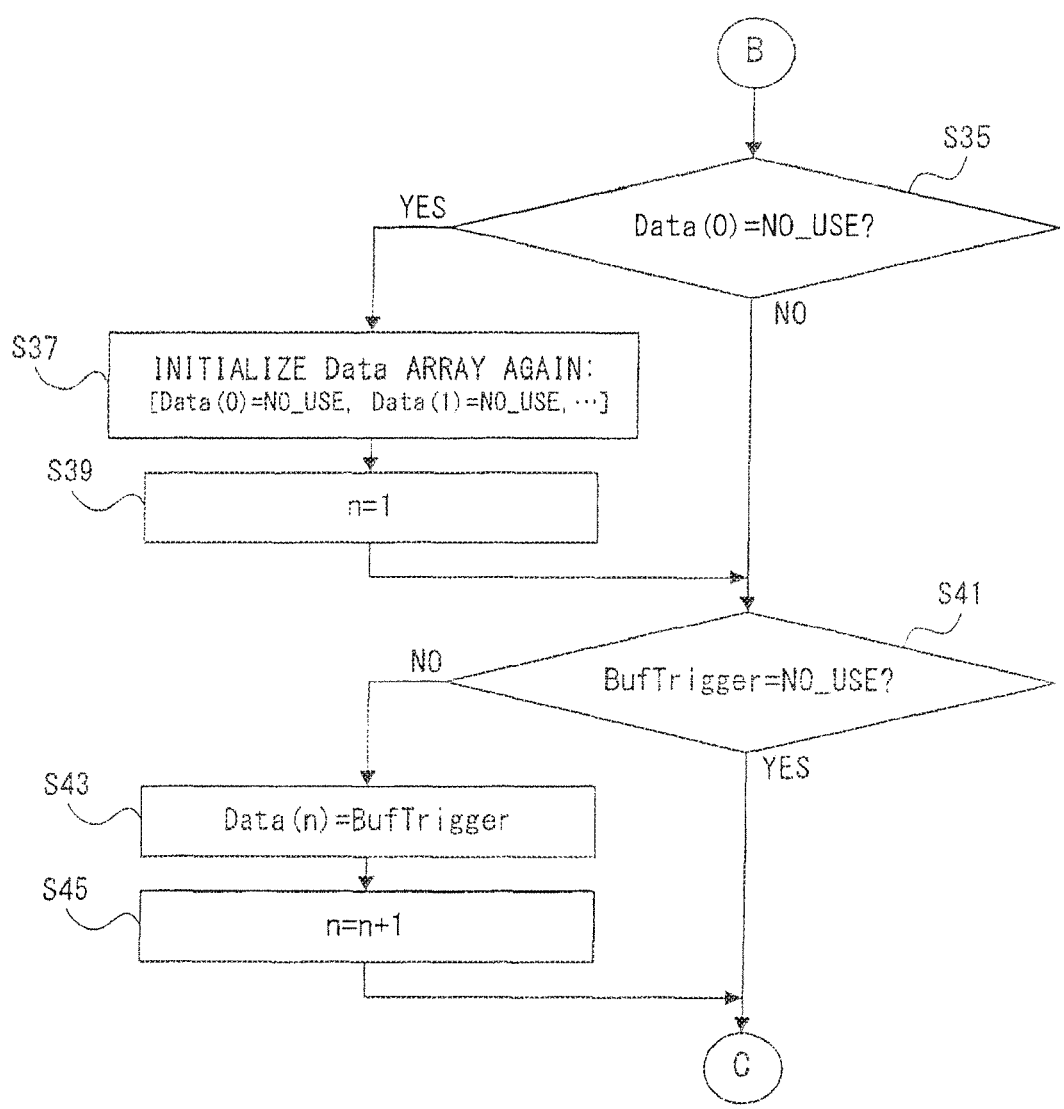
FIG. 12 is a flowchart showing a still another operation of the CPU applied to FIG. 1 embodiment.

Referring to FIG. 12, it is determined whether or not the Data (0) is "NO_USE" in the step S35, and if the determination result is "NO", the process proceeds to a step S41. If the determination result in the step S35 is "YES", the Data array is reset in a step S37, "1" is set to the variable n again in a step S39, and then, the process shifts to the step S41. By executing the processing in the step S37, when an action (verb) is not designated by a touch operation (no action is registered in the Data (0)), a field designated (registered in Data (n)) by a previous touch operation is invalidated. Thus, if an instruction is made in an order according to the Japanese syntax, after a character (field) being a subject and a character (field) being an object by a first touch operation are designated, an action being a verb has to be designated by a second touch operation, and therefore, a sliding touch operation is required at the first touch operation. On the other hand, if an instruction is made in an order according to the English syntax, a character being a subject is designated by the first touch operation, then, an action being a verb is designated by a second touch operation, and finally, a character being an object is designated by a third touch operation. Thus, each of the touch operation can be performed by a click-touch operation. In this manner, designations according to two different kinds of input orders can be realized in two different kinds of touch operations.

In the step S41, it is determined whether or not the variable BufTrigger is "NO_USE", and if the determination result is "NO", the process proceeds to a step S47. If the determination result in the step S41 is "YES", the variable BufTrigger is set to the Data (n) in a step S43, the variable n is incremented in a step S45, and then the process proceeds to the step S47.

Figure 13:
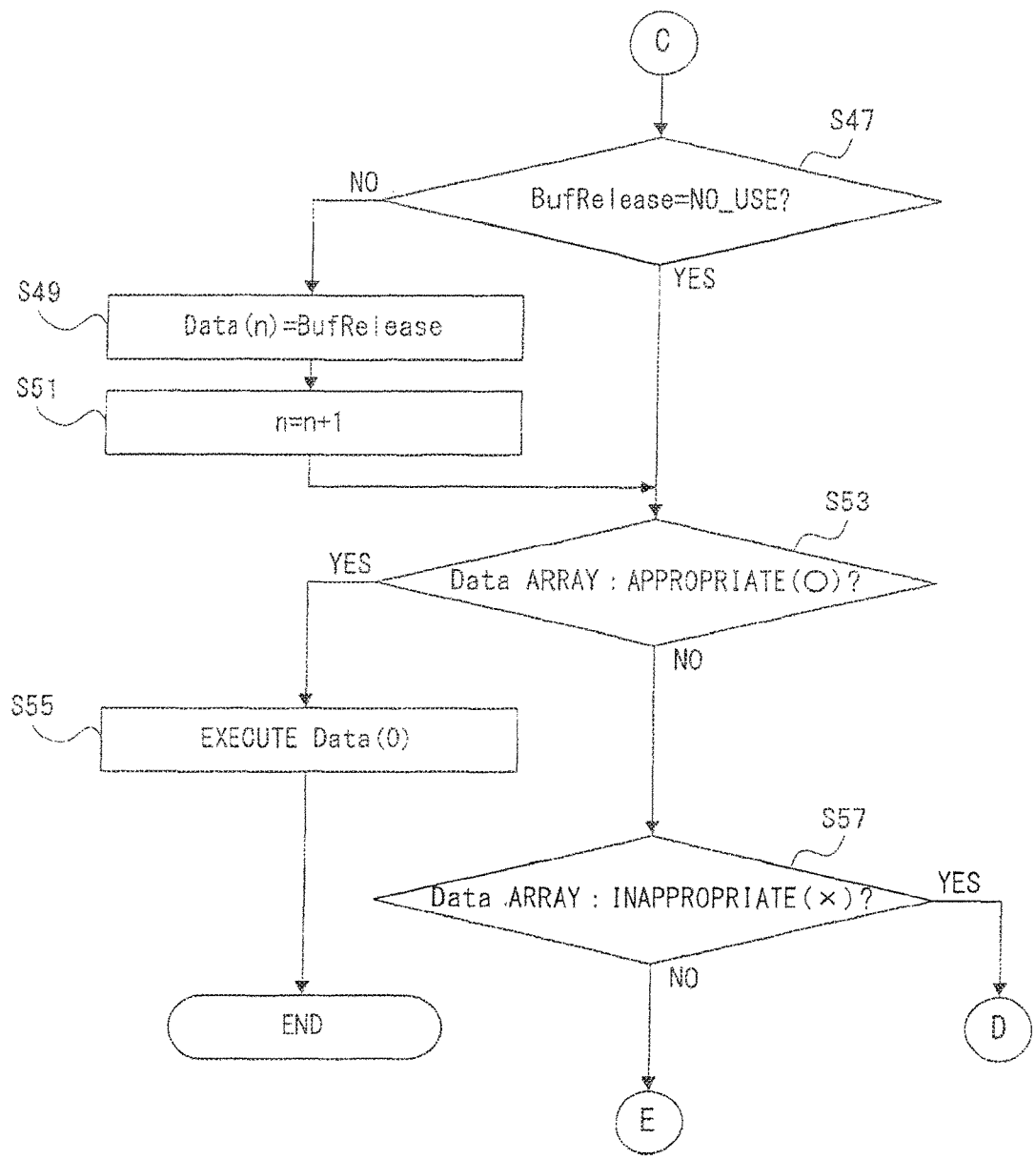
FIG. 13 is a flowchart showing a further operation of the CPU applied to FIG. 1 embodiment.

Referring to FIG. 13, in the step S47, it is determined whether or not the variable BufRelease is "NO_USE", and if the determination result is "YES", the process proceeds to a step S53. If the determination result in the step S47 is "NO", the variable BufRelease is set to the Data (n) in a step S49, the variable n is incremented again in a step S51, and the process proceeds to the step S53.

Accordingly, if no action is set in the Data (0) after the touch operation, the Data array is reset. Then, if any field is set in the variable BufTrigger, the field is set to the Data (1), and if any field is set in the variable BufRelease, the field is set to the Data (2).

In the step S53, it is determined whether or not the Data array is appropriate (○) on the basis of the Data array DB and the judgment standard DB (76c and 76d: see FIG. 14), and if the determination result is "YES", the Data (0) is executed in a step S55, and then, the process is ended.

If the determination result in the step S53 is "NO", it is further determined whether or not the Data array is inappropriate (x) in a step S57, and if the determination result is "YES", the process returns to the step S1. If the determination result in the step S57 is "NO", that is, if the Data array is neither appropriate nor inappropriate (Δ), the process returns to the step S5.

According to the process in FIG. 10-FIG. 13, if A wants to make an attack on C, when the user inputs "F1-F3/A1" according to the Japanese syntax, the Data array at a time when a first sliding touch operation "F1-F3" is completed (see FIG. 8(A)) goes as follows.

Data (0)=NO_USE, Data (1)=F1, Data (2)=F3

Then, at a time when a successive click-touch operation "A1" is completed (see FIG. 8(B)), the Data array goes as follows.

Data (0)=A1, Data (1)=F1, Data (2)=F3

On the other hand, when the user inputs "F1/A1/F3" according to the English syntax, the Data array at a time when a first click-touch operation "F1" is completed (see FIG. 9(A)) goes as follows.

Data (0)=NO_USE, Data (1)=F1, Data (2)=NO_USE

At a time when a successive click-touch operation "A1" is completed (see FIG. 9(B)), the Data array goes as follows.

Data (0)=A1, Data (1)=F1, Data (2)=NO_USE

Then, at a time when a successive click-touch operation "F3" is completed (see FIG. 9(C)), the Data array goes as follows.

Data (0)=A1, Data (1)=F1, Data (2)=F3

Thus, according to both of the Japanese syntax and the English syntax, it is possible to obtain the Data array being complying with the Data array DB (76c: see FIG. 3). The Data array thus obtained is determined to be "appropriate (○)" according to the judgment standard DB (76d) in the step S53, and consequently, the processing corresponding to the Data array, that is, the attack processing on C by A is executed in a step S55.

As understood from the above description, in this embodiment, the CPU core 34 repeatedly accepts a touch operation for designating at least one out of the plurality of command elements (fields F1-F4 and actions A1, A2, . . . : see FIG. 6) making up of a command (S7, S9, S13, S15) and writes the command element corresponding to the accepted touch operation in the buffer area 74 (S11, S17).

Here, the touch operation includes a click-touch operation (first operation) for designating a single command element with a point, and a sliding touch operation (second operation) for designating a plurality of command elements with a line. A click-touch operation includes a touch-on operation to an arbitrary point P0 within the touch panel 24, and a touch-off operation from the point P0 (see FIG. 8(B), FIG. 9(A)-FIG. 9(C)). A sliding touch operation includes a touch-on operation to an arbitrary first point P0 within the touch panel 24, a sliding operation from the first point P0 to an arbitrary second point P1 within the touch panel 24, and a touch-off operation from the second point P1 (see FIG. 8(A)).

Furthermore, the buffer area 74 includes a BufTrigger area 74a and a BufRelease area 74b. In the BufTrigger area 74a, a command element corresponding to a touch-on operation is stored, and in the BufRelease area 74b, a command element corresponding to a touch-off operation is stored.

Additionally, in response to the buffer writing processing, at least any one of the first memory writing processing for writing a first command element (action A1, A2, . . . ) out of the command elements stored in the buffer area 74 having a specific attribute to the Data (0) area 72a (first memory), and a second memory writing processing for writing a second command element (field F1-F4) having an attribute different from the specific attribute out of the command elements stored in the buffer area 74 in the Data (1) area 72b-Data (3) area 72d (second memory) (S23-S51).

Then, every time that any one of the memory writing processing is executed, it is determined whether or not the command element array stored in the Data (0) area 72a—the Data (3) area 72d satisfies an execution allowable condition (Data array DB: 76c) (S53), and when it is determined that the command element array satisfies an execution allowable condition, processing according to the command element array is executed (S55).

According to this embodiment, for each touch operation, out of the corresponding command elements, an action is written to the Data (0), a field is written to each of Data (1)-Data (3), and therefore, the user can change a touching order between the action and the fields when a touch operation is performed. Furthermore, any one of the click-touch operation and the sliding touch operation can arbitrarily be selected as a touch operation. Then, if a selection frequency of the sliding touch operation is heightened, the number of operations is decreased.

It should be noted when it is determined that a field is designated in the above-described step S9, it may only be determined whether or not any field is designated in the step S15. That is, when a field is designated at a start of a touch, a designation of only the field is validated and a designation of the action is not allowed at an end of the field. Thus, in a case of a sliding touch operation, only an operation from the field to the field is validated, an operation from the field to action can be invalidated. That is, it is possible to prevent a designation of the input order according to the English syntax from being performed by a sliding touch operation.

Furthermore, whether or not a click-touch operation is accurately performed may be determined on the basis of an elapsed time from a start of the touch to an end of the touch. That is, on assumption that the same filed or action is designated at a start of the touch and an end thereof by a slide touch operation, it is possible to prevent the slide touch operation from being erroneously determined to be a click-touch operation. In order to realize this, a step of "count processing" may be provided after the step S7, and after "YES" in the step S19, a step of determining "whether or not the count value is within a predetermined value" may be provided. Then, if the count value is within a predetermined value, the process may proceed to the step S21, and if the count value is not within a predetermined value, the process may return to the step S5.

In this embodiment, although a sliding touch operation is valid with respect to two command elements corresponding to a touch starting position and a touch ending position, three or more command elements may be designated by a single sliding touch operation. A modified example thereof is explained below. The modified example is the same as the above-described embodiment except for a part of the memory map and a part of the main program. Thus, FIG. 1, FIG. 2 and FIG. 4-FIG. 9 are utilized to assist the explanation below.

Figure 14:
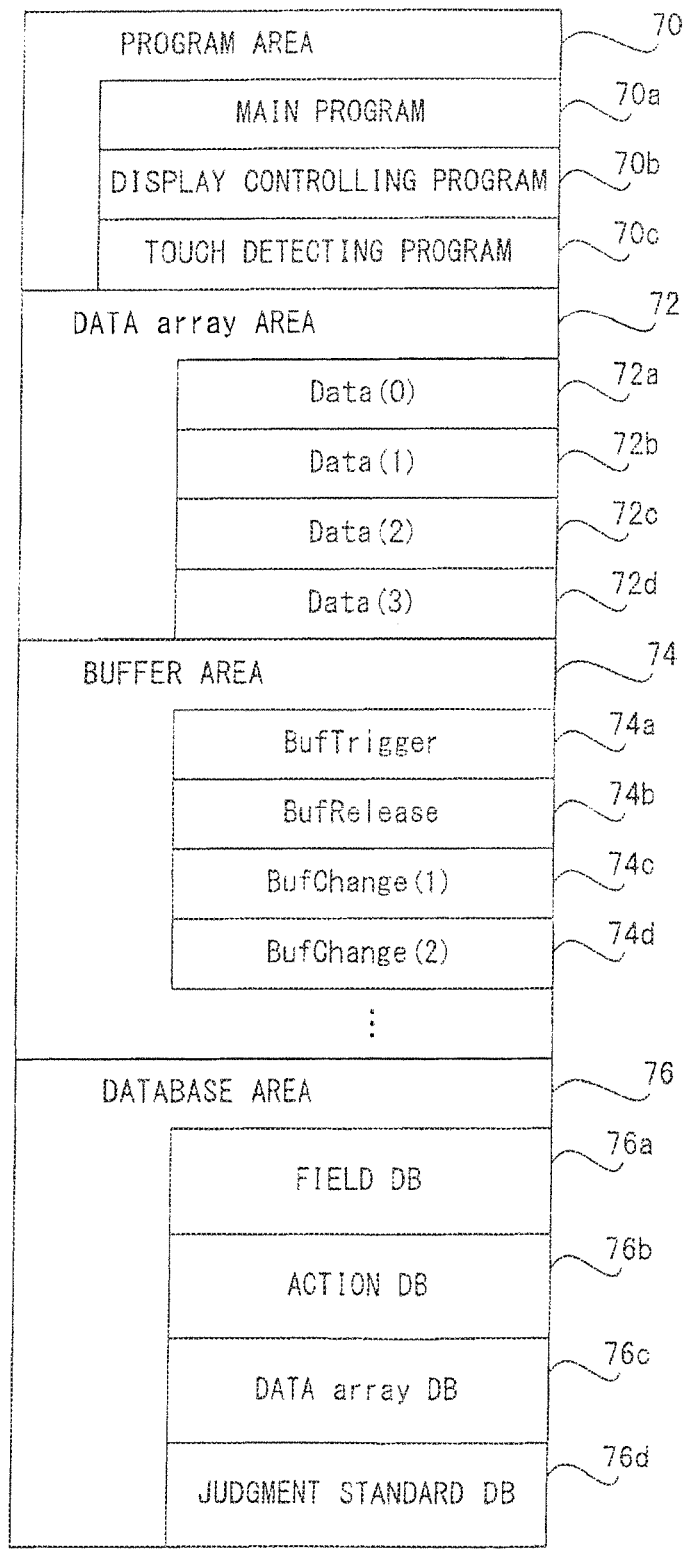
FIG. 14 is an illustrative view showing a memory map of a RAM applied to a modified example of FIG. 1 embodiment.

FIG. 14 shows a memory map of the RAM 42 applied to the modified example. With reference to FIG. 14 in comparison with FIG. 3, the buffer area 74 further includes a BufChange (1) area 74c storing a BufChange (1), a BufChange (2) area 74d storing a BufChange (2), . . . .

FIG. 15-FIG. 19 show a flowchart corresponding to a main program of the modified example. In FIG. 15-FIG. 19, the same reference numbers are assigned to the processing being in common to the main program (FIG. 10-FIG. 13) in the previous embodiment.

The flowchart of FIG. 15-FIG. 19 is a flowchart obtained by adding steps S12a-S12e between the steps S11 and S13, steps S34a-S34d between the steps S33 and S35, and steps S46a-S46d between the steps S45 and S47 in a flowchart in FIG. 10-FIG. 13.

Figure 15:
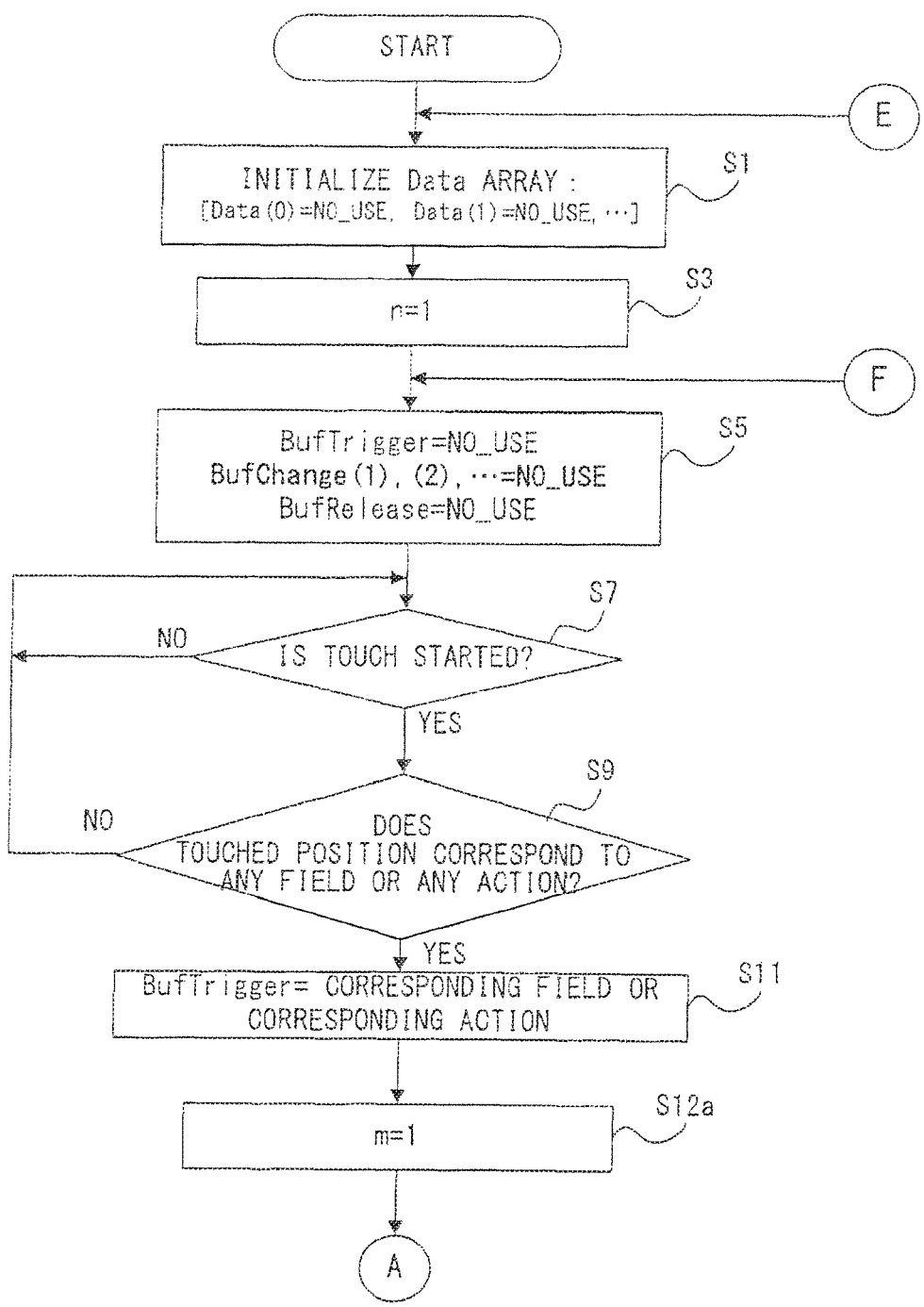
FIG. 15 is a flowchart showing apart of an operation of the CPU applied to the modified example in FIG. 14.

In what follows, the processing of the CPU core 34 is described by concentrating on the difference with the previous embodiment. Referring to FIG. 15, in steps S1-S11, the processing the same as the step S1-S11 (see FIG. 10) of the previous embodiment is performed. However, in the step S5, "NO_USE" is set to each of the variables BufChange (1), BufChange (2), . . . as well as the variable BufTrigger and the variable BufRelease.

Figure 16:
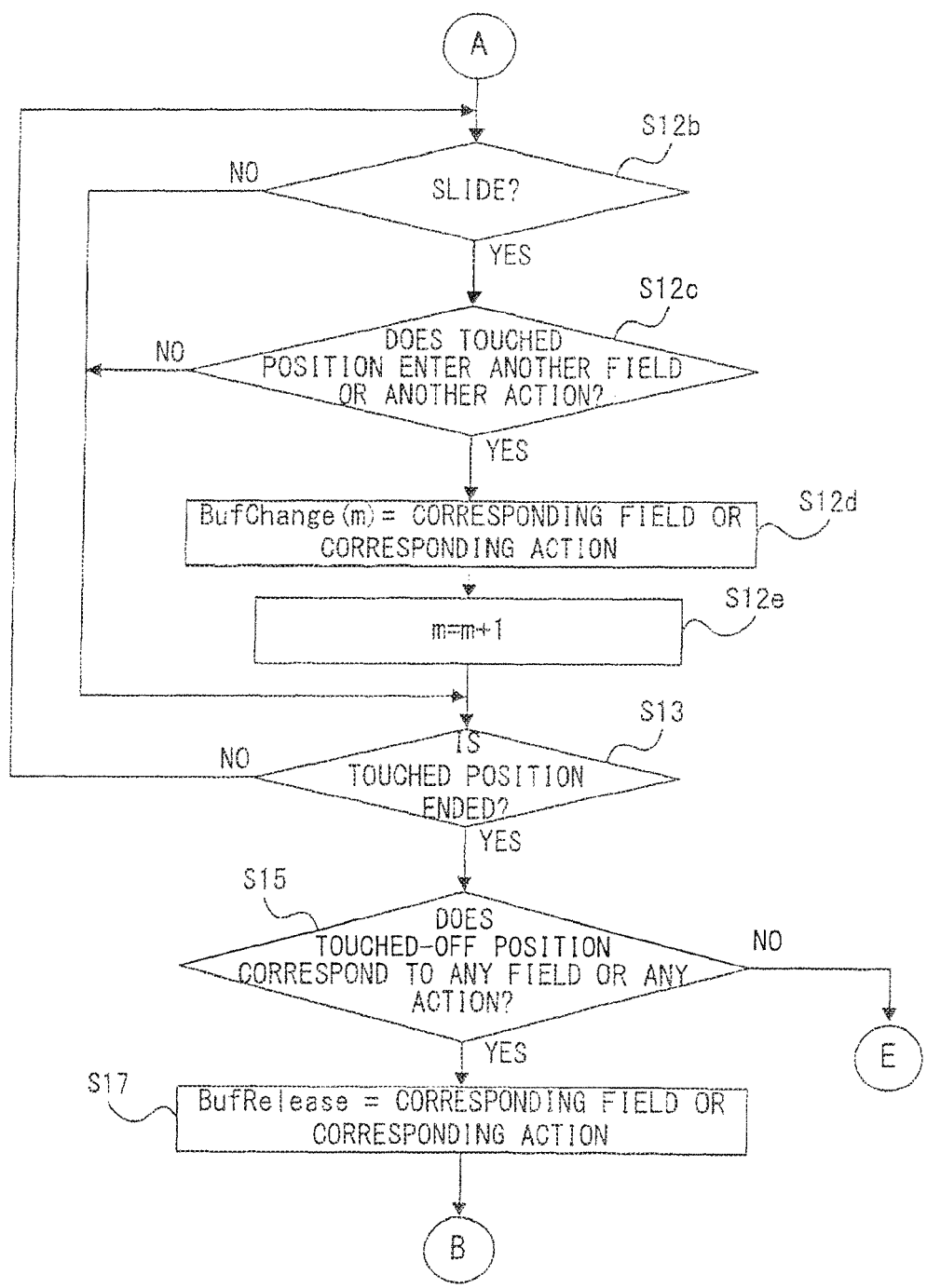
FIG. 16 is a flowchart showing another part of the operation of the CPU applied to the modified example in FIG. 14.
Figure 17:
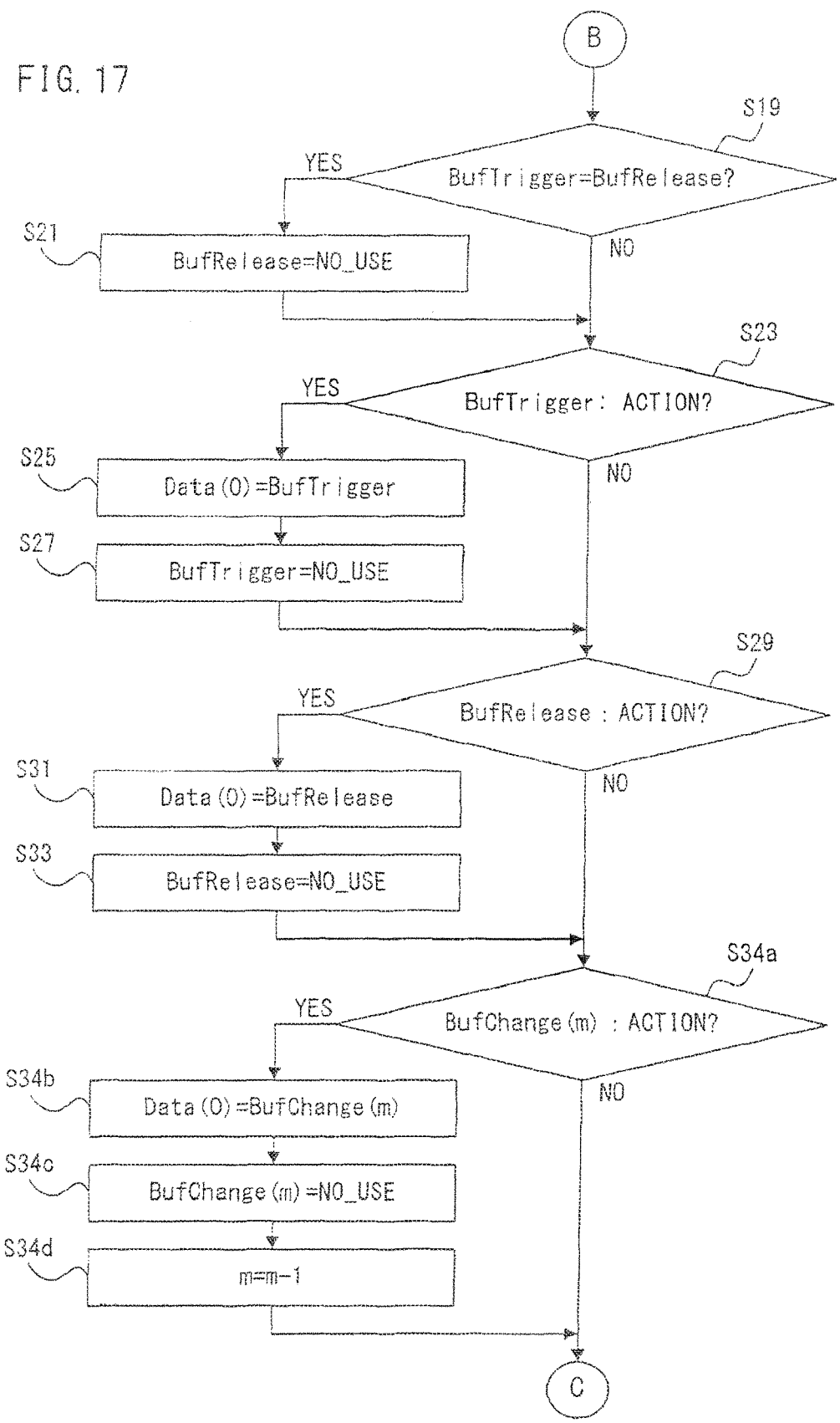
FIG. 17 is a flowchart showing a still another part of the operation of the CPU applied to the modified example in FIG. 14.
Figure 18:
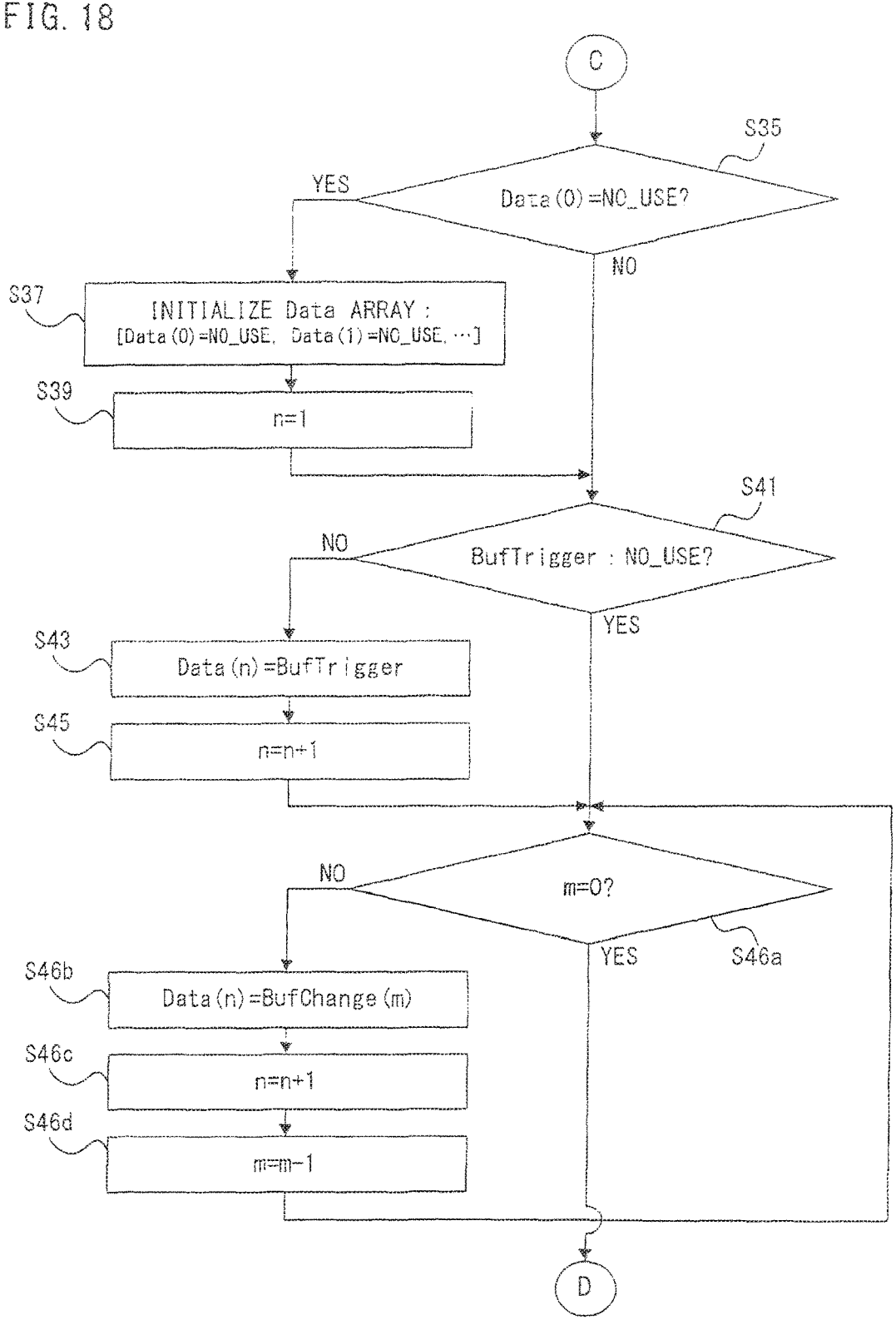
FIG. 18 is a flowchart showing a further part of the operation of the CPU applied to the modified example in FIG. 14.

In the succeeding step S12a, "1" is set to a variable m indicating the number of fields/actions designated by a current sliding touch operation. Referring to FIG. 16, in the step S12b, it is determined whether or not a sliding operation is executed on the basis of a change of a touched position. If the change of the touched position (that is, the difference between the touched coordinates previously output and the touched coordinates currently output from the touch panel 24) is below a threshold value, "NO" is determined in the step S12b, and the process proceeds to the step S13.

If the determination result in the step S12b is "YES", it is further determined whether or not the current touched position corresponds to another field or another action in the step S12c, and if "NO" here, the process proceeds to the step S13. If the touched position enters a display area of another field or another action, "YES" is determined in the step S12c, and the process shifts to the step S12d. In the step S12d, a corresponding field or a corresponding action is set to the variable BufChange (m). Then, in the step S12e, the variable m is incremented, and then, the process proceeds to the step S13.

In the step S13, similar to the step S13 in the previous embodiment, it is determined whether or not a touch operation is ended, and if the determination result is "YES", the process shifts to the step S15, but if the determination result is "NO", the process returns to the step S12b.

Accordingly, until the touch operation is ended, the processing from the step S12b-S12e is repeatedly executed, and a series of fields/actions corresponding to a part of the slide of a sliding touch operation being made up of a touch on, a slide and a touch off is set to the BufChange (1), the BufChange (2), . . . .

In the steps S15-S33, the processing similar to the step S15-S33 (see FIG. 10 and FIG. 11) in the previous embodiment is performed. However, if the determination result in the step S29 is "NO", the process proceeds to the step S34a, and if the determination result in the step S29 is "YES", the process proceeds to the step S34a through the steps S31 and S33.

In the step S34a, it is determined whether or not the variable BufChange (m) belongs to "action", and if the determination result is "NO", the process proceeds to the step S35. If the determination result in the step S34a is "YES", the variable BufChange (m) is set to the Data (0) in the step S34b, the variable BufChange (m) is reset in the step S34c, the variable m is decremented in the step S34d, and then, the process proceeds to the step S35.

Thus, if any action is set to the variable BufChange (m), the action is an action last designated in the sliding touch operation, and therefore, the action is set to the Data (0). Thereafter, the BufChange (m) is reset, and the variable m is decremented.

In the steps S35-S45, the processing similar to the steps S35-S45 (see FIG. 12) in the previous embodiment is executed. If the determination result in the step S41 is "YES", the process proceeds to the step S46a, and if the determination result in the step S41 is "NO", the process proceeds to the step S46a through the steps S43 and S45.

In the step S46a, it is determined whether or not the variable m is "0", and if the determination result is "YES", the process proceeds to the step S47. If the determination result in the step S46a is "NO", the variable BufChange (m) is set to the Data (n) in the step S46b, the variable n is incremented in the step S46c, and the variable m is decremented in the step S46d, and then, the process returns to the step S46a.

Accordingly, until m=0, the steps S46b-S46d are repeatedly executed, and as a result, the BufChange (2) is set to the Data (1), and the BufChange (1) is set to the Data (2), for example.

Figure 19:
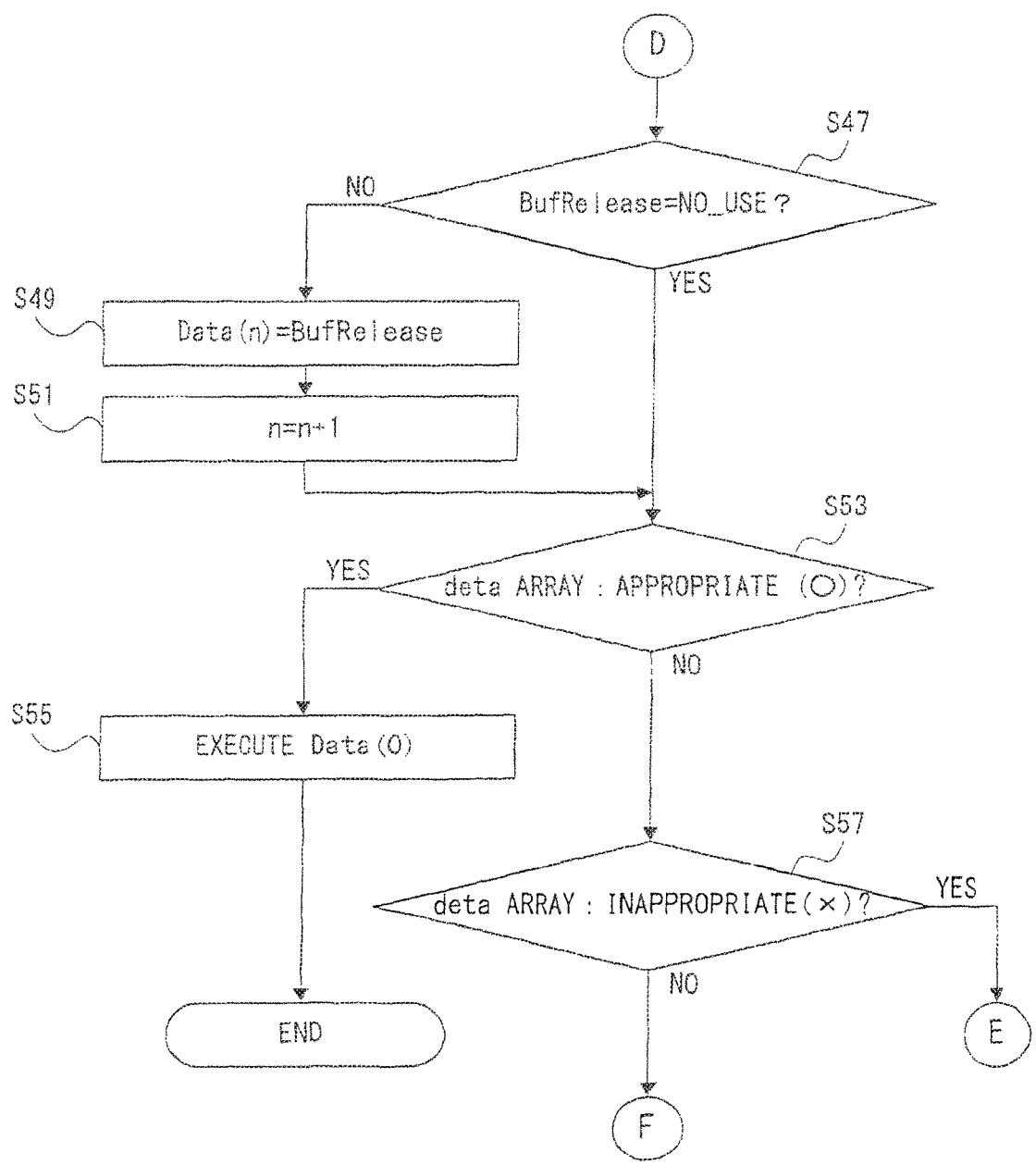
FIG. 19 is a flowchart showing a still further part of the operation of the CPU applied to the modified example in FIG. 14.

Referring to FIG. 19, in the steps S47-S57, the processing the same as the steps S47-S57 in the previous embodiment is executed.

According to the processing in FIG. 15-FIG. 19, similar to the case according to the processing in FIG. 10-FIG. 13, in a case that A wants to make an attack on C, even if "F1-F3/A1" is input according to the Japanese syntax or even if "F1/A1/F3" is input according to the English syntax, the Data array complying with the Data array DB can be obtained, and consequently, processing corresponding to the obtained Data array, that is, attack processing on C by A is executed.

Furthermore, unlikely to the case according the processing in FIG. 10-FIG. 13, even if "F1-F3-A1" is input in place of "F1-F3/A1", that is, "S+O+V" is input by a single sliding touch operation, a similar attack processing is executed. Furthermore, even if "F3-F1-F2-A4" is input in place of "F3-F1/A4/F2", the game apparatus 10 executes interchange processing between "A" and "B" by "C".

As understood from the above description, in the modified example, the CPU core 34 repeatedly accepts a touch operation for designating at least one out of the plurality of command elements (field F1-F4 and action A1, A2, . . . ) making up of a command (S7, S9, S13, S15, S12b, S12c), and writes a command element corresponding to the accepted touch operation in the buffer area 74 (S11, S17, S12d).

Here, the touch operation includes a click-touch operation (first operation) and a sliding touch operation (second operation). Furthermore, the buffer area 74 further includes the BufChange (1) area 74c, the BufChange (2) area 74d, . . . in addition to the BufTrigger area 74a and BufRelease area 74b. In the BufChange (1) area 74c and the BufChange (2) area 74d, . . . , a series of command elements corresponding to a sliding operation (the rest of the operation obtained by removing a touch-on operation and a touch-off operation from the sliding touch operation) is stored.

Furthermore, at least one of the first memory writing processing and the second memory writing processing is executed in response to the buffer writing processing (S23-S51, S34a-S34d, S46a-S46d). Then, every time that any of the memory writing processing is executed, it is determined whether or not the command element array stored in the Data (0)-Data (4) satisfies the execution allowable condition (Data array DB: 76c) (S53), and when it is determined that the command element array satisfies the execution allowable condition, the processing according to the command element array is executed (S55).

Due to this, three or more command elements can be designated by a single sliding touch operation.

It should be noted that in each of the embodiment and the modified example, the touch panel 24 is utilized as a means of accepting operations of designating a plurality of command elements in turn, but other pointing devices such as a mouse, a track ball, a touch pad, a keyboard, etc. can be utilized.

In the above description, although the game apparatus 10 is explained, the present invention can be applied to other information processing apparatuses such as a personal computer, a hand-held information terminal, a cellular phone, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory recording medium storing an information processing program for use with an information processing apparatus that includes at least one hardware processor, wherein the information processing program comprises instructions that are configured to cause the at least one hardware processor to:
  execute an application program;
  accept input provided to the information processing apparatus that designates a plurality of command elements, the plurality of command elements for forming a command for execution by the application program, wherein the application program is configured to accept designation of the plurality of command elements in anyone of a plurality of different designation orders;
  in response to designation of each one of the plurality of command elements, determine whether the plurality of command elements that have been so far designated form the command;
  based on determination that the command is not complete, accept further input to the information processing apparatus that designates at least one additional command element of the plurality of command elements that forms the command; and based on determination that the command is complete, execute the command in the application program, where execution of the command in the application program does not depend on an order in which the plurality of command elements are designated.

2. The non-transitory recording medium according to claim 1, wherein the information processing program comprises further instructions configured to cause the at least one hardware processor to write, to a memory device, each designated command element.

3. The non-transitory recording medium according to claim 2, wherein the input includes a first input that designates a single command element with a point, and a second input that designates multiple command elements with a line.

4. The non-transitory recording medium according to claim 1, wherein the plurality of command elements include a first command element and a second command element.

5. A non-transitory recording medium according to claim 4, wherein said first command element is a command element having a function of a verb in a natural language, and said second command element is a command element having a function of any one of a subject and an object in association with said verb.

6. The non-transitory recording medium according to claim 5, wherein:
said natural language includes a first natural language forming a sentence indicating said command in an order of a subject, an object and a verb, and a second natural language forming the sentence indicating said command in an order of a subject, a verb and an object, and
the accepted input designates the plurality of command elements of said command according the natural language selected from among at least the first natural language and the second natural language.

7. The non-transitory recording medium according to claim 1, wherein determination on whether the command is complete or not complete is based on accessing a database describing one or a plurality of executable command element arrays.

8. The non-transitory recording medium of claim 1, wherein the information processing process processes the information as instructed by the command formed by the command elements designated in the accepting process.

9. The non-transitory recording medium of claim 1, wherein the command includes an instruction and the information processing process executes the instruction to process the information.

10. The non-transitory recording medium of claim 1, wherein said information processing program causes the computer to further execute:
a command selection process which selects the command from a plurality of available commands.

11. A non-transitory recording medium, storing an information processing program, wherein said information processing program causes a computer of an information processing apparatus for processing information according to a command to execute:
an accepting process accepting an operation to designate a plurality of command elements of said command, the accepting process being performed to designate each of said command elements of said command; and
a memory writing process writing to a memory the command element corresponding to the operation accepted by said accepting process; wherein said operation includes a first operation for designating a single command element with a point, and a second operation for designating a plurality of command elements with a line, wherein:
said plurality of command elements of said command are displayed on a display,
said first operation is a click-touch operation including a touch-on operation to an arbitrary point within a touch panel provided on said display and a touch-off operation from said point, and
said second operation is a sliding touch operation including a touch-on operation to an arbitrary first point within said touch panel, a sliding operation from said first point to an arbitrary second point within said touch panel, and a touch-off operation from said second point, and
an information processing process processing information according to said plurality of command elements accepted in said accepting process.

12. The non-transitory recording medium according to claim 11, wherein:
said information processing program causes said computer to further execute a buffer writing process writing a command element corresponding to the operation accepted by said accepting process in a buffer,
said buffer includes a first buffer and a second buffer,
said buffer writing process writes a command element corresponding to said touch-on operation in said first buffer while writing a command element corresponding to said touch-off operation in said second buffer, and
said memory includes a first memory and a second memory, and said memory writing process writes the command elements stored in said first buffer and said second buffer in response to the writing processing by said buffer writing process in said first memory or said second memory.

13. The non-transitory recording medium according to claim 12, wherein:
said information processing program causes said computer to further execute:
a determining step for determining whether or not the command element stored in said first buffer and the command element stored in said second buffer are coincident with each other after the writing processing by said buffer writing step; and
a resetting step for resetting said second buffer when said determining step determines that the command element stored in said first buffer and the command element stored in said second buffer are coincident with each other.

14. The non-transitory recording medium according to claim 12, wherein said buffer further includes a third buffer, and
said buffer writing step further writes one or a plurality of command elements corresponding to said sliding operation in said third buffer.

15. An information processing apparatus comprising:
a processing system that includes at least one processor with hardware circuitry, the processing system configured to:
execute an application program;
accept input provided to the information processing apparatus that designates a plurality of command elements, the plurality of command elements for forming a command for execution by the application program, wherein the application program is configured to accept designation of the plurality of command elements in anyone of a plurality of different designation orders;

in response to designation of each one of the plurality of command elements, determine whether the plurality of command elements that have been so far designated form the command;

based on determination that the command is not complete, accept further input to the information processing apparatus that designates at least one additional command element of the plurality of command elements that forms the command; and based on determination that the command is complete, use execute the command in the application program, where execution of the command in the application program does not depend on an order in which the plurality of command elements are designated.

16. A method of processing information according to a command, the method comprising:

executing an application program on a computer system;

accepting input provided to the computer system that designates a plurality of command elements, the plurality of command elements for forming a command for execution by the application program, wherein the application program is configured to accept designation of the plurality of command elements in anyone of a plurality of different designation orders;

in response to designation of each one of the plurality of command elements, determining whether the plurality of command elements that have been so far designated form the command;

based on determination that the command is not complete, accepting further input to the computer system that designates at least one additional command element of the plurality of command elements that form the command; and based on determination that the command is complete, executing the command in the application program, where use of the command in the application program does not depend on an order in which the plurality of command elements have been designated.

17. An information processing system for processing information according to a command, comprising:

an input device configured to accept input provided by a user;

a processing system that includes at least one processor with hardware circuitry, the processing system coupled to the input device, the processing system configured to:

execute an application program;

accept, via the input device, provided input that designates a plurality of command elements, the plurality of command elements for forming a command for execution by the application program, wherein the application program is configured to accept designation of the plurality of command elements in anyone of a plurality of different designation orders;

in response to designation of each one of the plurality of command elements, determine whether the plurality of command elements that have been so far designated form the command;

based on determination that the command is not complete, accept further input to the information processing system that designates at least one additional command element of the plurality of command elements that form the command; and based on determination that the command is complete, execute the command in the application program, where execution of the command in the application program does not depend an order in which the plurality of command elements are designated.

* * * * *